(12) United States Patent
Yabuki et al.

(10) Patent No.: US 9,139,954 B2
(45) Date of Patent: Sep. 22, 2015

(54) AQUEOUS COLORING COMPOSITION FOR TEXTILE PRINTING, TEXTILE PRINTING METHOD, AND FABRIC

(71) Applicant: FUJIFILM CORPORATION, Minato-ku, Tokyo (JP)

(72) Inventors: Yoshiharu Yabuki, Kanagawa (JP); Yoshiaki Kondo, Kanagawa (JP); Hiromi Kobayashi, Kanagawa (JP); Tomoaki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/217,502

(22) Filed: Mar. 18, 2014

(65) Prior Publication Data

US 2014/0196223 A1    Jul. 17, 2014

Related U.S. Application Data

(63) Continuation of application No. PCT/JP2012/074278, filed on Sep. 21, 2012.

(30) Foreign Application Priority Data

Sep. 30, 2011 (JP) .................................. 2011-218116

(51) Int. Cl.
| | |
|---|---|
| *D06P 5/00* | (2006.01) |
| *D06P 5/30* | (2006.01) |
| *C09B 29/36* | (2006.01) |
| *C09D 11/00* | (2014.01) |
| *C09D 11/328* | (2014.01) |
| *D06P 3/24* | (2006.01) |
| *D06P 1/06* | (2006.01) |

(52) U.S. Cl.
CPC . *D06P 5/30* (2013.01); *C09B 29/36* (2013.01); *C09D 11/00* (2013.01); *C09D 11/328* (2013.01); *D06P 5/00* (2013.01); *D06P 1/06* (2013.01); *D06P 3/241* (2013.01)

(58) Field of Classification Search
CPC ...... C09D 11/30; C09D 11/00; C09D 11/328; C09B 29/36; C06P 5/00; C06P 5/30; C06P 3/241
USPC ........................................................... 8/499
See application file for complete search history.

(56) References Cited

U.S. PATENT DOCUMENTS

| | | | |
|---|---|---|---|
| 2003/0126693 A1 | 7/2003 | Siemensmeyer et al. | |
| 2004/0143108 A1* | 7/2004 | Egli et al. | 534/777 |
| 2005/0233097 A1 | 10/2005 | Tojo et al. | |
| 2006/0258854 A1 | 11/2006 | Egli et al. | |

FOREIGN PATENT DOCUMENTS

| | | |
|---|---|---|
| CN | 1500124 | 5/2004 |
| JP | H06-192976 A | 7/1994 |
| JP | H07-173780 A | 7/1995 |
| JP | 2001-525478 A | 12/2001 |
| JP | 2004-511610 A | 4/2004 |
| JP | 2004-515657 A | 5/2004 |
| JP | 2004-534110 A | 11/2004 |
| JP | 2005-281391 A | 10/2005 |
| JP | 2009-507083 A | 3/2007 |
| JP | 2007-203741 A | 8/2007 |
| JP | 2009-227895 A | 10/2009 |
| JP | 2010-163507 A | 7/2010 |
| JP | 2010-229251 A | 10/2010 |
| WO | 2010/130386 A1 | 11/2010 |

OTHER PUBLICATIONS

STIC Search Report dated Feb. 24, 2015.*
English language translation of the following: Office action dated Dec. 11, 2014, from the SIPO in a Chinese patent application corresponding to the instant patent application. This office action translation is submitted now in order to supplement the understanding of the cited references which are being disclosed in the instant Information Disclosure Statement.
English language translation of the following: Office action dated Feb. 3, 2015, from the JPO in a Japanes patent application corresponding to the instant patent application. This office action translation is submitted now in order to supplement the understanding of the cited references which are being disclosed in the instant Information Disclosure Statement.
Written Opinion of the ISA issued in International Application No. PCT/JP2012/074278 on Dec. 25, 2012.
International Search Report issued in International Application No. PCT/JP2012/074278 on Dec. 25, 2012.

* cited by examiner

*Primary Examiner* — Eisa Elhilo
(74) *Attorney, Agent, or Firm* — Solaris Intellectual Property Group, PLLC

(57) ABSTRACT

An aqueous coloring composition for textile printing, the aqueous coloring composition being capable of forming an image which exhibits a high color optical density and excellent water resistance; a textile printing method and a kit, using the same; and a fabric, in which an image exhibiting both a high color optical density and excellent water resistance is formed, are provided. The aqueous coloring composition for textile printing includes a colorant and water, in which the molecule of the colorant contains both a chromophoric group and a dissociable group which is in a dissociated state, the chromophoric group and a negative electric charge generated by the dissociation of the dissociable group form a conjugated system, and the number of dissociable groups in the molecule of the colorant is the same as the number of chromophoric groups therein.

6 Claims, No Drawings

AQUEOUS COLORING COMPOSITION FOR TEXTILE PRINTING, TEXTILE PRINTING METHOD, AND FABRIC

CROSS-REFERENCE TO RELATED APPLICATIONS

This application is a continuation application of International Application No. PCT/JP2012/074278, filed Sep. 21, 2012, which is incorporated herein by reference. Further, this application claims priority from Japanese Patent Application No. 2011-218116, filed Sep. 30, 2011, which is incorporated herein by reference.

TECHNICAL FIELD

The present invention relates to an aqueous coloring composition for textile printing, a textile printing method, and a fabric.

BACKGROUND ART

An image printing method by an inkjet system is a method of allowing fine liquid droplets of ink to fly from an inkjet recording head, and allowing the droplets to adhere to a recording medium to be recorded, thereby performing printing. The inkjet system is advantageous in that the mechanism is relatively simple, the cost is low, and a high definition and high quality image can be formed.

Meanwhile, current fabric printing is performed by screen printing or the like. For such printing, it is necessary to prepare a plate copper for printing or a screen printing plate, before printing. Since it takes time and labor to prepare plates, and plates are very expensive, it is necessary to perform production in an excess of a certain amount, in order to collect the cost. For the purpose of small-scale production, production of a sample, or the like, a printing system without plate making is demanded.

In connection to the above, textile printing using an inkjet system, with which a dye can be supplied directly to a fabric, has been proposed. Inkjet textile printing is different from conventional textile printing, and is advantageous in that it is not necessary to prepare a plate, and an image having excellent gradation property can be formed quickly, and further, has merits in that delivery times may be shortened, answering to production of wide variety of products in small volume may be realized, a process of plate making is not needed, and the like. Moreover, since only an amount of ink necessary for image formation is used, inkjet textile printing is advantageous in terms of environment such that the volume of waste liquid is small as compared with the conventional methods.

In textile printing, the type of dye used is determined according to the type of fiber in fabric. For forming an image onto a fabric which is mainly composed of polyamide fiber such as silk, wool, or nylon, a method of using an acid dye has been proposed.

In general, the following properties are required with respect to the ink for inkjet textile printing.

(1) To form color with a sufficient density,
(2) to exhibit excellent color reproducibility,
(3) not to cause bleeding of formed image, or not to cause pollution of non-image area or other fabric, during the post-treatment process and/or laundering,
(4) not to cause clogging of nozzles of a recording head,
(5) not to cause change in physical properties (for example, viscosity) or precipitation of solids during storage of ink,
(6) to be able to carry out jetting stably without change in jetting properties, even after long-term storage, and
(7) that the formed image has excellent fastness (water resistance).

In regard to the task (1), generally, the concentration of dye in ink is heightened. However, a high-concentration dye ink may become high viscous due to evaporation of water, aqueous organic solvent, or the like from the nozzle tip, or a dye in a solid state may precipitate, whereby the problem (4) may be caused.

As a trial for obtaining high coloring force by using, as a colorant, an oxonol dye having a high molar absorption coefficient and excellent thermostability, a technique of enhancing the solubility of a dye having a specific structure and coloring a hydrophobic polymer substance by a printing method has been proposed (see, for example, Japanese Patent Application National Publication (JP-A) No. 2009-507083).

In regard to the task (2), study has been made in order to obtain stable color reproducibility, in the case of providing printed matters having the same pattern, by adjusting the hue of the dye used or physical properties of ink (see, for example, JP-A No. 2004-515657, and Japanese Patent Application Laid-Open (JP-A) Nos. 2007-203741 and 2009-227895).

In regard to the task (3), examination on improvement by adding a specific compound into ink has been conducted. However, when a colorant having an insufficient color optical density is used, the solids concentration in the ink is inevitably increased, and thus the task (5) and the task (6) are inevitable.

Improvement work by applying a specific pretreatment agent to fabric has also been carried out. For example, treatments of fabric by using a pretreatment liquid that contains a quaternary ammonium- or amino group-containing compound (see, for example JP-A No. H6-192976), a cationized starch (see, for example, JP-A No. H7-173780), an aqueous synthetic polymer compound (see, for example, JP-A No. 2010-163507), or the like have been proposed.

As a method for improvement in regard to the task (4), a method of using a specific aqueous solvent and the like has been proposed.

For example, a method of using trimethylolpropane or pentaethylene glycol as an aqueous organic solvent, and a method of adding a specific polyoxyethylene alkyl ether to ink have been proposed (see, for example, JP-A No. 2010-229251).

Application of a compound, which has a dissociable group and in which a metal is coordinated to the nitrogen atom of an azo bond, or a mixture thereof to textile printing use has been disclosed (see, for example, JP-A No. 2004-511610).

SUMMARY OF INVENTION

Technical Problem

The technique shown in JP-A No. 2009-507083 is a technique which includes dissolving, in an organic solvent, an anionic dye which is in a dissociated state. Accordingly, the fundamental property of the oxonol dye, such that the chromophoric group is aqueous (water-soluble), is not practically used, and lowering of color optical density per weight may be caused due to the hydrophobic group to be introduced.

In order to achieve a sufficient color optical density in the inkjet textile printing, it is particularly important to develop a colorant, which is highly aqueous, exhibits a high color optical density per weight, can be supplied to a fabric at an appropriate amount, and has the highest dyeing property as possible with respect to the fiber that has been subjected to a post treatment process.

In the case of using the techniques shown in JP-A No. 2004-515657, JP-A No. 2007-203741, and JP-A No. 2009-227895, colorants of some colors exhibit insufficient color optical density, and therefore, in present circumstances, satisfactory results have not yet been obtained.

When using the techniques shown in JP-A No. H6-192976, JP-A No. H7-173780, and JP-A No. 2010-163507, there are cases in which an effect of pretreatment agent is insufficient depending on the structure of the dye used for various colors. Therefore, in present circumstances, satisfactory results have not been obtained from the viewpoints of color optical density and the like.

In the case of using the technique shown in JP-A No. 2010-229251, satisfactory results have not been obtained in the cases other than the case of using an extremely peculiar combination of a dye to be used and an aqueous organic solvent. Particularly, when a colorant having an insufficient color optical density is used, a solid concentration in the ink is inevitably increased, and thus a large extent of improvement cannot be expected.

Also in the case of using the compound described in JP-A No. 2004-511610, a sufficient color optical density is not obtained.

As described above, by the use of conventional techniques, an ink for inkjet textile printing which can realize sufficient color optical density and also having water resistance has not yet been obtained. In present circumstances, development of a colorant having both color optical density and water resistance is desired.

The invention has been made in view of the above problems.

Namely, the invention aims to provide an aqueous coloring composition for textile printing, the aqueous coloring composition being capable of forming an image which exhibits a high color optical density and excellent water resistance, a textile printing method using the same, and a fabric in which an image capable of exhibiting both a high color optical density and excellent water resistance is formed.

Solution to Problem

The present inventors have conducted intensive investigations in view of the above problems, and as a result, found that a coloring composition which can perform dyeing at a sufficient density, particularly when printing a polyamide fiber and with which an image formed exhibits excellent water resistance can be realized by an aqueous coloring composition for textile printing, the aqueous coloring composition including a colorant in which a negative electric charge generated by dissociation is in a state of conjugating with a chromophoric group.

The invention provides the followings.

<1> An aqueous coloring composition for textile printing, the aqueous coloring composition comprising a colorant and water, wherein:

a molecule of the colorant comprises a chromophoric group and a dissociable group that is in a dissociated state;

the chromophoric group and a negative electric charge, generated by dissociation of the dissociable group, form a conjugated system; and a number of the dissociable groups in the molecule of the colorant is the same as a number of the chromophoric groups in the molecule.

<2> The coloring composition according to <1>, which is to be used for printing a fabric comprising a polyamide fiber.

<3> The coloring composition according to <1> or <2>, wherein the colorant is an azo dye represented by the following Formula 1.

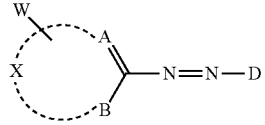

Formula 1

In Formula (1), W represents the dissociable group; D represents a cyclic hydrocarbon group or a heterocyclic group, and does not include a dissociable group in which a negative electric charge generated by dissociation conjugates with the azo group; each of A and B independently represents a carbon atom, a nitrogen atom, an oxygen atom, a sulfur atom, or an atomic group comprising at least one atom selected from the group consisting of a carbon atom and a nitrogen atom; X represents an atomic group comprising at least one atom selected from the group consisting of a carbon atom, a nitrogen atom, an oxygen atom and a sulfur atom; A, B, X, and the carbon atom bonded to the azo group form a five-membered ring or a six-membered ring; the five-membered ring or the six-membered ring may be condensed with an aromatic ring to form a condensed ring; and W is a substituent that bonds to the five-membered ring, the six-membered ring, or the condensed ring.

The five-membered ring or six-membered ring, which is formed of A, B, X, and the carbon atom bonded to the azo group in Formula 1 is preferably an aromatic compound selected from the group consisting of benzene, naphthalene, cyclopentene, cyclohexene, pyridine, pirimidine, pyrazine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, indazole, benzimidazole, triazole, benzotriazole, oxazole, isoxazole, benzoxazole, thiazole, benzothiazole, isothiazole, benzisothiazole, oxadiazole, thiadiazole, benzisoxazole, barbituric acid, thiobarbituric acid, isoxazolone, pyridone, rhodanine, hydantoin, thiohydantoin, oxazolidinedione, pyrazolidinedione, indandione, dihydrofuran-2-one, pyrrolin-2-one, pyrazolopyridone, and Meldrum's acid, or a tautomer thereof.

<4> The coloring composition according to any one of <1> to <3>, wherein the colorant is a dye.

<5> The coloring composition according to any one of <1> to <4> being an ink for inkjet recording.

<6> A textile printing method comprising applying, by an inkjet method, the coloring composition according to any one of <1> to <5> to a fabric comprising a polyamide fiber.

<7> A fabric comprising an image printed by the method according to <6>.

<8> A kit for textile printing, the kit comprising the coloring composition according to any one of <1> to <5> and a fabric comprising a polyamide fiber.

Effects of Invention

According to the invention, an aqueous coloring composition for textile printing, the aqueous coloring composition being capable of forming an image which exhibits a high color optical density and excellent water resistance, a textile printing method using the same, and a fabric in which an image capable of exhibiting a high color optical density and excellent water resistance is formed may be provided.

DESCRIPTION OF EMBODIMENTS

In this specification, a numerical range indicates a range that includes a numerical value expressed as a lower limit value of the numerical range as the minimum value and a numerical value expressed as an upper limit value of the numerical range as the maximum value.

In the case of referring to an amount of a certain component in a composition, in a case in which plural substances corresponding to the component are present in the composition, the amount of the component means a total amount of the plural substances which are present in the composition, unless otherwise specified.

The term "process" includes not only an independent process, but also one that cannot be clearly distinguished from other process, as long as the predetermined action of this process is achieved thereby.

<Aqueous Coloring Composition for Textile Printing>

An aqueous coloring composition for textile printing according to an embodiment of the invention includes water and a colorant (hereinafter, may also be referred to as a "specific colorant") having a chromophoric group and a dissociable group which is in a dissociated state, in which the chromophoric group and a negative electric charge generated by the dissociation of the dissociable group can form a conjugated system, and the colorant has one dissociable group per one chromophoric group. Hereinafter, the aqueous coloring composition for textile printing according to the embodiment of the invention may also be referred to as, simply, a "coloring composition".

Since the coloring composition has the configuration described above, an aqueous coloring composition capable of forming an image which exhibits a high color optical density and excellent water resistance can be obtained. The reason is not clear, but it is thought as follows.

A negative electric charge generated by the dissociation of the dissociable group in a molecule of the specific colorant is in the state of conjugating with the chromophoric group in the molecule of the specific colorant, and the specific colorant has one dissociable group, which is in a dissociated state and is capable of forming a conjugated system with the chromophoric group, per one chromophoric group.

Since a negative electric charge is generated by the dissociation of the dissociable group in the molecule of the specific colorant, the chromophoric group itself is anionic. It is thought as the reason the excellence of the water solubility of the specific colorant, which is necessary for the preparation of a coloring composition. Further, it is thought that, since the chromophoric group itself takes the form of an anion structure that is necessary for dyeing a fiber of a fabric or the like, the chromophoric group is directly and strongly fixed to the fiber.

Accordingly, it is thought that, by the use of the coloring composition, the solubility of the colorant can be enhanced, as well as dyeing and fixation of the colorant onto fiber at a sufficient density can be realized.

As described above, in the specific colorant, in which a negative electric charge generated by dissociation conjugates with a chromophoric group, the chromophoric group itself can realize both improvement in solubility of the colorant and fixation onto the fiber. Therefore, as compared with conventional acid dyes, a required number of acid groups possessed by the molecule of colorant can be reduced. It is thought as becoming possible to design a compact acid dye molecule as a result thereof.

It is thought that the affinity of the coloring composition to fiber is improved and dyeing property can be enhanced as a result thereof. Thereby, textile printing with a sufficient color optical density can be realized.

Further, since the negative electric charge of dye and the positive electric charge possessed by a polyamide fiber bonds to each other with a strong Coulomb's force, the image formed by using the coloring composition has excellent water resistance.

The specific colorant is particularly effective for textile printing by an inkjet method, which involves a restriction in a supply amount of a colorant onto fabric while, needless to say, the specific colorant can also be preferably applied to conventional screen textile printing methods.

Hereinafter, the specific colorant contained in the coloring composition, and various components which may be contained if necessary are explained in detail.

[Colorant (Specific Colorant)]

The coloring composition includes a colorant having a chromophoric group and a dissociable group which is in a dissociated state, in which the chromophoric group and a negative electric charge generated by the dissociation of the dissociable group can form a conjugated system, and the colorant has one dissociable group per one chromophoric group.

From the viewpoints of dyeing property with respect to fiber, hue, and various kinds of water resistance of the image to be obtained, the specific colorant uses a colorant which is in a state in which a negative electric charge generated by dissociation conjugates with the chromophoric group.

Generally, in textile printing, colorants are used in the form in which the chromophoric group such as an azo group is electrically neutral, as shown, for example, on the left-hand side (L1) of the following Reaction Scheme 1. In contrast, the specific colorant uses, as a colorant, a dye in an anion state, in which the dissociable group (in the following Formula 1, the hydroxyl group) being present in the conjugation position of the azo group is made to dissociate and the negative electric charge generated by the dissociation conjugates with the chromophoric group, as shown on the right-hand side (R1) of the following Reaction SchemeScheme 1.

REACTION SCHEME 1

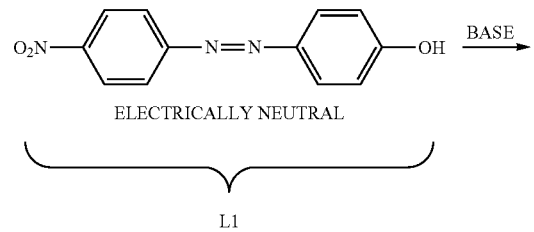

ELECTRICALLY NEUTRAL

L1

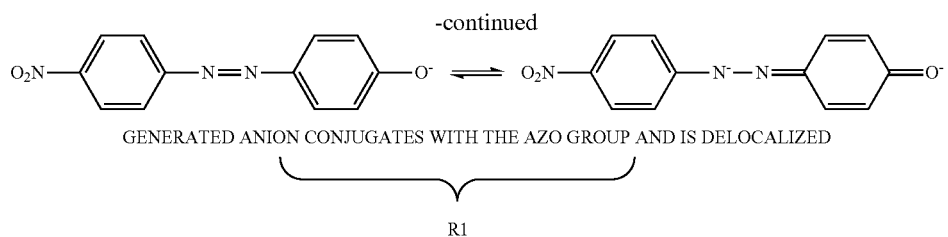

GENERATED ANION CONJUGATES WITH THE AZO GROUP AND IS DELOCALIZED } R1

The chromophoric group is an atomic group which serves to extend the conjugated system or serves to make the charge imbalance greater in an atomic group of unsaturated bond system, and examples thereof include an azo group and a methine chain. A representative example of the dissociable group in which an anion generated by the dissociation of the dissociable group can conjugate with a chromophoric group is a hydroxyl group, but a mercapto group, a sulfonamide group, an active methylene group, a heterocycle having a low pKa, or the like can also be used preferably. Among them, a hydroxyl group and a sulfonamide group are preferable, and a hydroxyl group is more preferable.

The dissociable group that generates a negative electric charge capable of conjugating with a chromophoric group is explained.

REACTION SCHEME 2

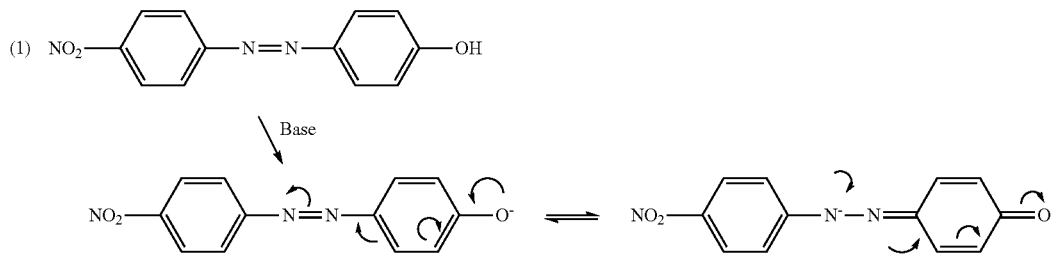

The hydroxyl group is present in para position capable of conjugating with the azo group. The negative electric charge generated by dissociation conjugates with the azo group via a conjugated system of the benzene ring.

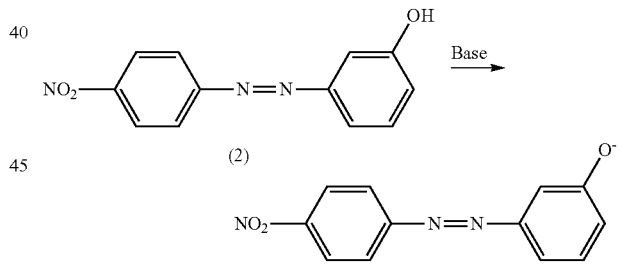

The hydroxyl group is present in the meta position being not capable of conjugating with the azo group. The negative electric charge generated by dissociation cannot conjugate with the azo group.

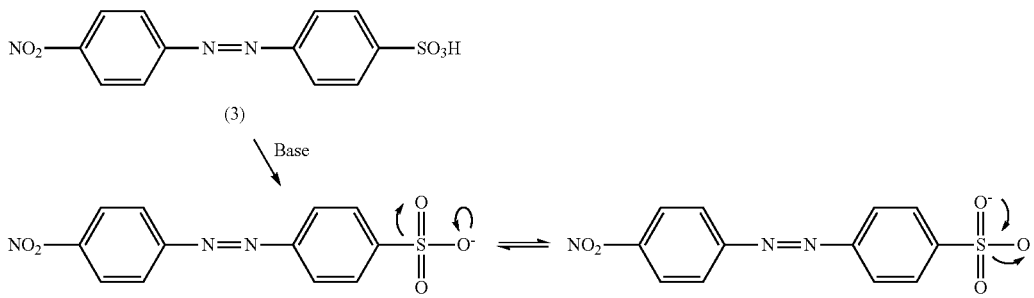

The sulfo group is present in the para position capable of conjugating with the azo group. However, the negative electric charge generated by dissociation is not present in the position capable of conjugating with the benzene ring. Accordingly, the negative electric charge cannot conjugate with the azo group. As a result, the negative electric charge conjugates only with the oxygen atoms on the sulfur atom.

Whether the dissociable group of the colorant is in a dissociated state or not can be easily judged by comparing the maximum absorption wavelength of the colorant. Generally, the maximum absorption wavelength of colorants, especially of dyes, shifts by increasing the electron donating property of an auxochrome. Since an anion (negative electric charge) is the strongest electron donating group, a colorant having a

REACTION SCHEME 3

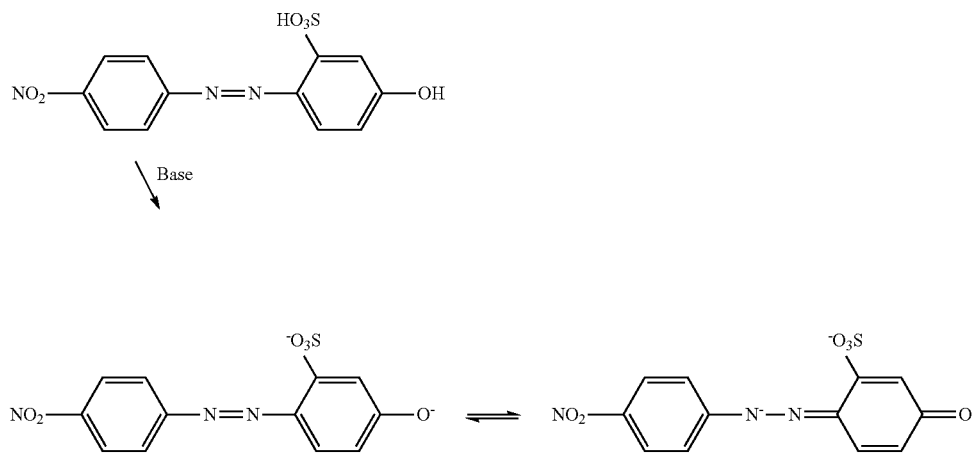

In Reaction Scheme 2, (1) shows, by way of flow of electron, the state in which a negative electric charge generated by the dissociation of the hydroxyl group conjugates with the azo group, in the compound having the azo group which is a chromophoric group and the hydroxyl group, which is a dissociable group and is present in the conjugation position of the azo group.

In (2), flow of electron such as that in (1) does not occur since the hydroxyl group is not in the conjugation position of the azo group.

In (3), a sulfo group, which is a dissociable group, is present in the conjugation position of the azo group; however, the negative electric charge of the sulfo group cannot conjugate with the azo group, since the negative electric charge generated by dissociation is in the position being not capable of conjugating with the benzene ring.

It is understood from the above that, in a compound having, as a chromophoric group, an azo group that bonds to a benzene ring, for allowing a negative electric charge generated by the dissociation of the dissociable group to conjugate with the azo group, the negative electric charge should be on the atom of a substituent that bonds to the benzene ring at the conjugation position (ortho position or para position).

Reaction Scheme 3 is an example of a compound having two kinds of dissociable groups each at the conjugation position of the azo group. The dissociation of the sulfo group is the first dissociation, and the dissociation of the hydroxyl group is the second dissociation, and thus, when this compound is treated with a base, the sulfo group is dissociated and then the hydroxyl group is dissociated, and as a result, two negative electric charges are generated. The negative electric charge generated by the dissociation of the hydroxyl group conjugates with the azo group, whereas the sulfo group does not have a nature of being able to conjugate with the azo group, and thus, this compound becomes to have a property which is demonstrated when the negative electric charge generated from the hydroxyl group conjugates with the azo group.

negative electron charge generated therein can greatly shift the maximum absorption wavelength, as compared with electrically neutral colorants.

Accordingly, as compared with the electrically neutral colorant shown in the left-hand side (L1) of Reaction Scheme 1 above, the maximum absorption wavelength of the colorant (specific colorant) in a state in which the negative electric charge generated by dissociation conjugates with the chromophoric group greatly shifts toward a longer wavelength side (deep color shift).

Therefore, in the specific colorant, it is possible to conduct hue adjustment in a wide range, and since a higher efficiency is exhibited as the maximum absorption wavelength of a colorant exists at a longer wavelength, the specific colorant is particularly preferably applied to, for example, a cyan dye, a blue dye, a violet dye, a magenta dye, or a red dye.

In an embodiment, it is preferable to use a colorant whose maximum absorption wavelength shifts toward a deeper color by 20 nm or more by the dissociation of the dissociable group.

From the viewpoints of stability over time, safety in handling, and prevention of corrosion of machines used, the pH of the coloring composition is preferably near neutral, and specifically, the pH is preferably from 5.0 to 9.0, and more preferably from 6.0 to 8.0. In a coloring composition in which the pH of the coloring composition is near neutral, in order that the auxochrome of the colorant is in a dissociated state, the pKa of the auxochrome in water is preferably 6.0 or less, more preferably 5.5 or less, and even more preferably 5.0 or less.

Specific examples of the colorant (specific colorant), in which a negative electric charge generated by dissociation conjugates with a chromophoric group, include an azo dye represented by Formula 1 described below, an oxonol dye represented by Formula 2 described below, and a dye represented by Formula 3 described below.

Hereinafter, the azo dye represented by Formula 1, the oxonol dye represented by Formula 2, and the dye represented by Formula 3 are described in order.

(Azo Dye Represented by Formula 1)

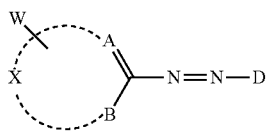

Formula 1

In Formula 1, W represents a dissociable group in a dissociated state, in which a negative electric charge generated by the dissociation of the dissociable group can form a conjugated system with the azo group that serves as a chromophoric group, and W is substituent that bonds to a five-membered ring or six-membered ring, which includes X as a component, or a condensed ring obtained by condensing an aromatic group thereto. D represents a residue of diazo component D-$NH_2$, and D represents a cyclic hydrocarbon group or a heterocyclic group, but never has a dissociable group in which a negative electric charge generated by dissociation conjugates with the azo group. Each of A and B independently represents a carbon atom, a nitrogen atom, an oxygen atom, a sulfur atom, or an atomic group including at least one atom selected from a carbon atom or a nitrogen atom. X represents an atomic group that forms a five-membered ring or a six-membered ring together with A, B, and the carbon atom bonded to the azo group, and includes at least one atom selected from a carbon atom, a nitrogen atom, an oxygen atom, or a sulfur atom. The five-membered ring or six-membered ring, which includes X as a component, may be condensed with an aromatic ring.

Examples of the hydrocarbon ring possessed by the cyclic hydrocarbon group represented by D in Formula 1 include hydrocarbon rings such as a cycloalkyl group, a cycloalkenyl group, a cycloalkynyl group, and an aryl group. In an embodiment, D is preferably an aryl group, which is an aromatic hydrocarbon group. As the aromatic hydrocarbon group (aryl group), a phenyl group, a naphthyl group, and the like are preferable.

The heterocycle possessed by the heterocyclic group represented by D in Formula 1 may be a ring including at least one heteroatom such as a nitrogen atom, a sulfur atom, a phosphorus atom, or an oxygen atom, other than a carbon atom and a hydrogen atom, as the constituent member that forms the ring. Specific examples include pyridine, pyrazine, pirimidine, pyridazine, triazine, quinoline, isoquinoline, quinazoline, cinnoline, phthalazine, quinoxaline, pyrrole, indole, furan, benzofuran, thiophene, benzothiophene, pyrazole, indazole, imidazole, benzimidazole, triazole, oxazole, isoxazole, benzoxazole, thiazole, benzothiazole, isothiazole, benzisothiazole, oxadiazole, thiadiazole, benzisoxazole, barbituric acid, pyridone, pyrrolidine, piperidine, piperazine, imidazolidine, and thiazoline.

Among them, pyridine, quinoline, thiophene, benzothiophene, pyrazole, imidazole, benzimidazole, triazole, oxazole, isoxazole, benzoxazole, thiazole, benzothiazole, isothiazole, benzisothiazole, oxadiazole, thiadiazole, and benzisoxazole are preferable. Pyridine, quinoline, thiophene, pyrazole, imidazole, benzoxazole, thiazole, benzothiazole, isothiazole, thiadiazole, and benzisoxazole are more preferable. Pyrazole, imidazole, benzothiazole, benzoxazole, 1,2,4-thiadiazole, and 1,3,4-thiadiazole are still more preferable.

The cyclic hydrocarbon group and heterocyclic group represented by D in Formula 1, each independently, may further have a substituent.

Further, the cyclic hydrocarbon group and the heterocyclic group, each independently, may be a condensed ring.

Each of A and B in Formula 1 independently represents a carbon atom, a nitrogen atom, an oxygen atom, a sulfur atom, or an atomic group including at least one atom selected from a carbon atom or a nitrogen atom.

Examples of the "atomic group including at least one atom selected from a carbon atom or a nitrogen atom" include —$CH_2$—, —C(R)H—, —CH=, —NH—, and —NR—. In —C(R)H— and —NR—, R represents a substituent such as an alkyl group, an aryl group, an acyl group, an alkoxy group, a hydroxyl group, or a halogen atom.

In Formula 1, A and B may be the same or different from each other.

X in Formula 1 represents an atomic group that forms a five-membered or six-membered aromatic ring together with A, B, and the carbon atom bonded to the azo group, and includes at least one atom selected from a carbon atom, a nitrogen atom, an oxygen atom, or a sulfur atom.

In a case in which the aromatic ring that includes X in Formula 1 is a 5-membered ring, X is an atomic group constituted of at least two atoms (or atomic groups). In a case in which the aromatic ring that includes X in Formula 1 is a 6-membered ring, X is an atomic group constituted of at least three atoms (or atomic groups). In these cases, the atomic group represented by X may be constituted of one kind of atom (or atomic group), or may be constituted of two or more kinds of atoms (or atomic groups).

An example of an atomic group constituted of one kind of atom (or atomic group) is —CH=CH—, and an example of an atomic group constituted of two kinds of atoms (or atomic groups) is —O—CH=.

The aromatic ring that includes X in Formula 1 may be a hydrocarbon ring or may be a heterocycle, or may have a monocyclic structure or a polycyclic structure (condensed ring) containing two or more rings condensed among themselves. Further, the aromatic ring that includes X in Formula 1 may further have a substituent on the ring.

Preferable examples of the aromatic ring that includes X in Formula 1 include, specifically, rings such as benzene or naphthalene.

Further, preferable examples of the heterocycle that includes X in Formula 1 include, specifically, the heterocycle represented by D in Formula 1, and heterocycles such as rhodanine, pyrazolidinedione, pyrazolopyridone, and Meldrum's acid.

The aromatic ring that includes X in Formula 1, namely, the 5-membered or 6-membered aromatic ring formed of A, B, X, and the carbon atom bonded to the azo group in Formula 1 is preferably an aromatic ring selected from the group consisting of benzene, naphthalene, cyclopentene, cyclohexene, pyridine, pirimidine, pyrazine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, indazole, benzimidazole, triazole, benzotriazole, oxazole, isoxazole, benzoxazole, thiazole, benzothiazole, isothiazole, benzisothiazole, oxadiazole, thiadiazole, benzisoxazole, barbituric acid, thiobarbituric acid, isoxazolone, pyridone, rhodanine, hydantoin, thiohydantoin, oxazolidinedione, pyrazolidinedione, indandione, dihydrofuran-2-one, pyrrolin-2-one, pyrazolopyridone, and Meldrum's acid, or a tautomer thereof, more preferably an aromatic ring selected from the group consisting of benzene, naphthalene, pyridine, quinoline, thiophene, pyrazole, imidazole, benzoxazole, thiazole, benzothiazole, isothiazole, thiadiazole, benzisoxazole, barbituric acid, pyridone, rhodanine, pyrazolidinedione, pyrazolopyridone, and Meldrum's acid, or a tautomer thereof, and still more preferably an aromatic ring selected from the group consisting of benzene, naphthalene, pyrazole, imidazole, benzothiazole, benzoxazole, 1,2,4-thiadiazole and 1,3,4-thiadiazole, barbituric acid, pyridone, rhodanine, pyrazolidinedione, and Meldrum's acid, or a tautomer thereof.

W in Formula 1 represents a dissociable group in a dissociated state, in which a negative electric charge generated by dissociation can form a conjugated system with the azo group that serves as a chromophoric group, and W is a dissociable group which is in a dissociated state and which is a substituent on a 5-membered ring or 6-membered ring, which includes X as a component, or a condensed ring obtained by condensing an aromatic group to the 5-membered ring or 6-membered ring, and a negative charge of the dissociable group conjugates with the azo group.

As a counter cation of the negative electric charge of the dissociable group that is in a dissociated state, any cation can be used. For example, the cation may be a cation (inorganic cation) derived from an inorganic compound, or may be a cation (organic cation) derived from an organic compound.

Examples of the inorganic cation include cations such as a cation of an alkali metal such as lithium, sodium, or potassium, a cation of an alkaline earth metal such as magnesium or calcium, and ammonium. However, in embodiments of the invention, the counter cation is never a transition metal, since transition metals form transition metal complexes and cause d-d transition (electron transition between d-orbitals in a center metal) or CT transition (electron transition between a ligand and a center metal), thereby exhibiting spectral characteristics different from the spectral characteristics utilized in the invention, which is exhibited when a negative electric charge conjugates with a chromophoric group.

An example of a case in which the counter cation is a transition metal may be an azo chelate compound described below; however, the maximum absorption wavelength of the compound never shifts to a longer wavelength by dissociation.

Azo Compound A

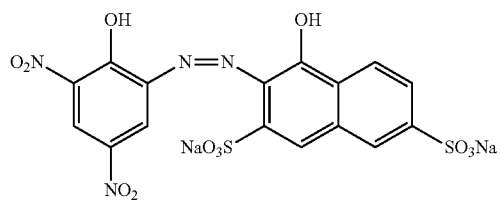

Azo Chelate Compound B

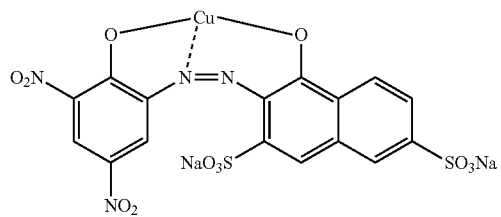

Maximum absorption wavelength: 569.8 nm Maximum absorption wavelength: 559.8 nm

The reason why the maximum absorption wavelength of the azo chelate compound B never shifts to a longer wavelength (or rather, shifts to a shorter wavelength) than the maximum absorption wavelength of the azo compound A in the non-dissociated state is because, as described above, the two negative electric charges generated from the hydroxyl groups and the azo group form coordination bonds with the copper ion, and as a result of which, the negative electric charges cannot conjugate with the azo group.

Examples of the organic cation include pyridinium, tetramethylammonium, guanidinium, tetramethylguanidinium, amidinium, and triethylammonium.

Preferable examples of W in Formula 1 include —O$^-$, —S$^-$, —N$^-$(R$^1$), and —C(R$^1$)(R$^2$). Here, each of R$^1$ and R$^2$ represents an electron withdrawing group having a Hammett σp value of 0.30 or higher, and specific examples include a cyano group, a sulfonyl group, an acyl group, an alkoxycarbonyl group, an aryloxycarbonyl group, a carbamoyl group, a sulfamoyl group, and a dicyanoethylene group.

In the specific colorant represented by Formula 1, the chromophoric group itself is aqueous by the negative electric charge (which may also referred to as "anionic group") of the dissociable group which is represented by W in Formula 1 and is in a dissociated state, but if necessary, the specific colorant may further have an aqueous group in the molecule.

Preferable examples of the aqueous group include a sulfo group and a salt thereof, a salt of a carboxyl group, a phosphoric acid group and a salt thereof, and a polyoxyethylene group.

As described above, the cyclic hydrocarbon group and heterocyclic group represented by D in Formula 1, each independently, may further have a substituent, and also the cyclic hydrocarbon group and heterocyclic group, which include X in Formula 1, each independently, may further have a substituent.

Examples of such a substituent include a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkylsulfinyl group, an arylsulfinyl group, an alkyl sulfonyl group, an arylsulfonyl group, an acyl group, an aryloxycarbonyl group, an alkoxycarbonyl group, a carbamoyl group, an arylazo group, a heterocyclicazo group, an imido group, a phosphino group, a phosphinyl group, a phosphinyloxy group, a phosphinylamino group, and a silyl group. Among all, those which are electron withdrawing groups are more preferable.

Preferable combinations of D, A, B, X, and W in Formula 1 are combinations of the preferable embodiments of the respective components described above.

(Oxonol Dye Represented by Formula 2)

Formula 2

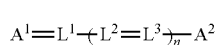

In Formula 2, each of A$^1$ and A$^2$ independently represents an acid nucleus, each of L$^1$, L$^2$, and L$^3$ represents a methine group, and n represents 0, 1, 2, or 3.

In a case in which the specific colorant is an oxonol dye represented by Formula 2, the acid nuclei represented by $A^1$ and $A^2$ in Formula 2 take the structures of a keto form and an enol form, respectively. The negative electric charge generated by the dissociation of the enol form conjugates with the polymethine group which is formed of $L^1$, $L^2$ and $L^3$ and serves as a chromophoric group. For example, an example of a case in which the acid nucleus is 5-pyrazolone is described below.

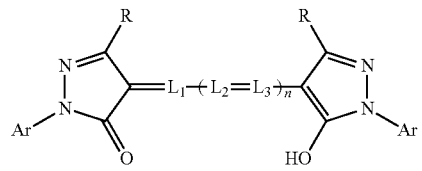

Acid Nucleus (keto form)   Acid Nucleus (enol form)

Base

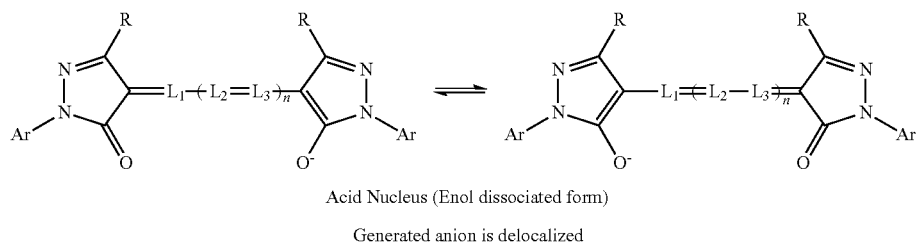

Acid Nucleus (Enol dissociated form)

Generated anion is delocalized

The acid nuclei represented by $A^1$ and $A^2$ in Formula 2 are each preferably an acid nucleus which is a group obtained by removing one or more hydrogen atoms from a cyclic ketomethylene compound, or an acid nucleus which is a group obtained by removing one or more hydrogen atoms from a compound which has electron withdrawing groups and a methylene group disposed therebetween.

Examples of the "cyclic ketomethylene compound" include 5-pyrazolone, rhodanine, hydantoin, thiohydantoin, 2,4-oxazolidinedione, isoxazolone, barbituric acid, thiobarbituric acid, indandione, dioxopyrazolopyridine, pyridone, pyrazolidinedione, 2,5-dihydrofuran-2-one, and pyrrolin-2-one. The cyclic ketomethylene compound may further have a substituent. Among them, 5-pyrazolone, barbituric acid, dioxopyrazolopyridine, and pyridone are preferable. Examples of the substituent include the same substituents as those exemplified as the substituent which may be possessed by the heterocycle represented by D in Formula 1.

The "compound which has electron withdrawing groups and a methylene group disposed therebetween" can be expressed by $Z^1$—$CH_2$—$Z^2$. Here, it is preferable that each of $Z^1$ and $Z^2$ independently represents —CN, —$SO_2R^1$, —$COR^1$, —$COOR^2$, —$CONHR^2$, —$SO_2NHR^2$, —C [=C (CN)_2] $NHR^1$, or —$CR^2$ [=$(CN)_2$]. In a preferable embodiment, $R^1$ represents an alkyl group, an aryl group, or a heterocyclic group, and $R^2$ represents a hydrogen atom, an alkyl group, an aryl group, or a heterocyclic group. The alkyl group, aryl group, and heterocyclic group represented by $R^1$ or $R^2$ may have a substituent. Examples of the heterocyclic group include a group obtained by removing one hydrogen atom from the heterocycle represented by D in Formula 1, and examples of the substituent include the same substituents as those exemplified as the substituent which may be possessed by the heterocycle represented by D in Formula 1.

(Dye Represented by Formula 3)

The specific colorant may be a dye represented by the following Formula 3. In a case in which m in Formula 3 is 1, the dye represented by Formula 3 is generally referred to as "triphenylmethane dye".

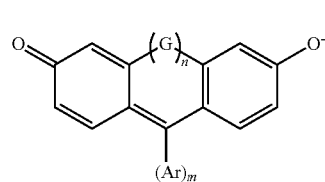

Formula 3

In Formula 3, G represents an oxygen atom or a sulfur atom, and n represents 0 or 1. Ar represents an aromatic hydrocarbon group or a heterocyclic group, and m represents 0 or 1. When m represents 0, the carbon atom that bonds to Ar bonds to a hydrogen atom instead of Ar.

In Formula 3, the ring to which ketone (O=) is bonded, the ring to which the dissociable group (O$^-$—) is bonded, the ring including G as a component in a case in which n is 1, and Ar, each independently, may further have a substituent.

In the dye represented by Formula 3, the skeleton including ketone (O=) and the ring to which the ketone is bonded, the ring to which the dissociable group (O$^-$—) is bonded, and the linking group including a carbon atom, which links these rings and bonds to Ar when m is 1 or bonds to a hydrogen atom when m is 0, is a chromophoric group.

In a case in which the specific colorant is the dye represented by Formula 3, the —O$^-$ in Formula 3 is the dissociable group that is in a dissociated state and forms a negative electric charge O$^-$ by dissociation. Such a negative electric charge conjugates with the chromophoric group having the above skeleton and thus, the negative electric charge is delocalized. This state is shown in the following reaction scheme.

Note that, in the structural formula shown in the following reaction scheme, G, n, Ar, and m have the same definitions as G, n, Ar, and m in Formula 3, respectively.

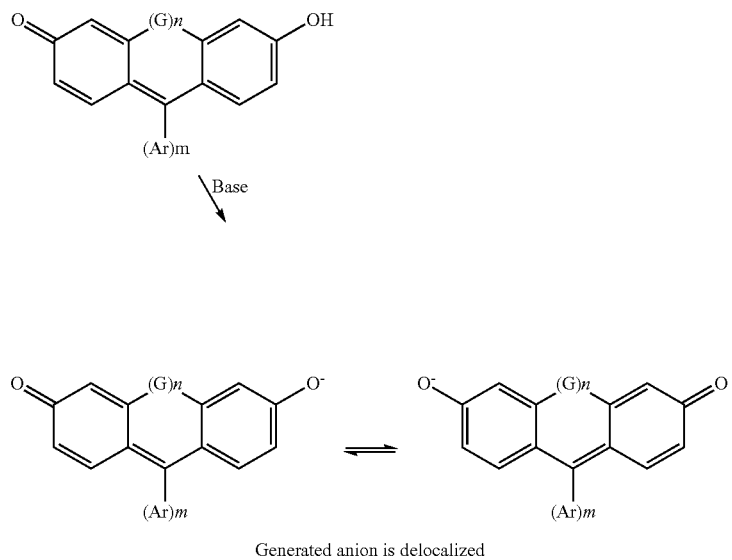

Generated anion is delocalized

An example of the dye represented by Formula 3 is phenolphthalein.

Among the various specific colorants represented by Formula 1 to 3 explained above, the azo dyes represented by Formula 1 can be preferably used, from the viewpoint of high light resistance.

Among the azo dyes represented by Formula 1, an azo dye represented by the following Formula 1-1 can be more preferably used.

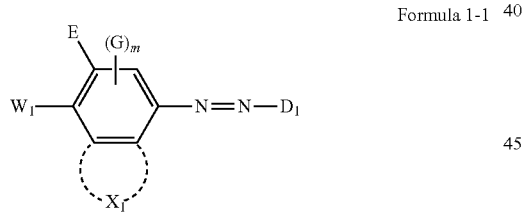

Formula 1-1

In Formula 1-1, $D_1$ represents a residue of diazo component $D_1$-$NH_2$, and $D_1$ may be a cyclic hydrocarbon group or a heterocyclic group. E represents a hydrogen atom, an acylamino group, or an electron withdrawing group. The benzene ring shown in Formula 1-1 may be condensed with a ring including $X_1$ as a component. G represents a substituent that bonds to the benzene ring shown in Formula 1-1 or the condensed ring including $X_1$ as a component. m represents an integer from 0 to 4. $W_1$ represents an anionic substituent selected from —O⁻, —S⁻, —N⁻($R^1$), and —C⁻($R^1$)($R^2$), and each of $R^1$ and $R^2$ independently represents an electron withdrawing group having a Hammett σp value of 0.30 or higher.

$D_1$ in Formula 1-1 is preferably an aromatic hydrocarbon group or a heterocyclic group having at least one electron withdrawing group. The aromatic hydrocarbon group or the heterocyclic group may be condensed with a benzene ring or a heterocycle. Further, the aromatic hydrocarbon group or the heterocyclic group may have a substituent. Examples of the heterocycle represented by $D_1$ include the heterocycles exemplified as the heterocycle represented by D in Formula 1, and so are the preferable examples.

Specifically, G in Formula 1-1 is preferably an acylamino group or an electron withdrawing group.

Regarding $R^1$ and $R^2$ in a case in which $W_1$ in Formula 1-1 represents an anionic substituent selected from —N⁻($R^1$) or —C⁻($R^1$)($R^2$), specific examples of the electron withdrawing group having a Hammett σp value of 0.30 or higher include a cyano group, a sulfonyl group, an acyl group, an alkoxycarbonyl group, an aryloxycarbonyl group, a carbamoyl group, a sulfamoyl group, and a dicyanoethylene group.

Each of the anionic groups has a counter cation, which may be a cation (inorganic cation) derived from an inorganic compound, or may be a cation (organic cation) derived from an organic compound, as described in the explanation of W in Formula 1. Above all, $W_1$ in Formula 1-1 is preferably an anionic group selected from —O⁻ or —N⁻($R^1$), and more preferably —O⁻.

The specific colorant, in which a negative electric charge generated by dissociation conjugates with the chromophoric group, can be used, for example, in the state of being dispersed in an aqueous colorant by being prepared into a slightly water-soluble polyvalent metal salt, like a lake pigment; however, it is preferable that the specific colorant is used in a water-soluble form, like a dye.

Hereinafter, specific examples of the specific colorant are shown, but the invention is not limited to these specific examples.

First, as specific examples of a red dye, magenta dye and violet dye represented by Formula 1, Specific Example 1 to Specific Example 46 are shown. Note that, Specific Example 1 to Specific Example 46 are shown in the form of omitting the notation of negative electric charge on the dissociated dissociable group and involving a counter cation (the notation of positive electric charge on the counter cation is also omitted). In Specific Example 1 to Specific Example 38, the group represented by A in the formula described on the upper side of each table is the dissociated group; in Specific Examples 39, 40, 42, 43, 45 and 46, —ONa is the dissociated group; and in Specific Examples 41 and 44, —OK is the dissociated group.

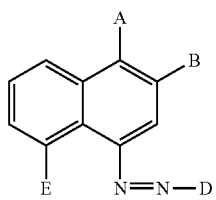

| | A | B | D | E |
|---|---|---|---|---|
| 1 | —ONa | —SO₂N(morpholino) | 2-Cl-5-(SO₂NH₂)phenyl | —NHSO₂Ph |
| 2 | —ONa | —SO₂N(morpholino) | 2-Cl-5-(SO₃Na)phenyl | —NHSO₂Ph |
| 3 | —OK | —C(O)N(morpholino) | 4-(OC₂H₄OCH₃)-3-(SO₂NH₂)phenyl | —NHSO₂CH₃ |
| 4 | —OK | —SO₂N(C₂H₅)₂ | 4-OCH₃-3-(SO₂NH₂)phenyl | —NHSO₂CH₃ |
| 5 | —OLi | —SO₂NHC(CH₃)₃ | 2,5-dimethyl-4-(SO₃Li)phenyl | —NHSO₂CH₃ |
| 6 | —OK | —SO₂C₂H₅ | 4-morpholino-3-(SO₂NH₂)phenyl | —NHSO₂-3-(CO₂K)phenyl |
| 7 | —ONa | —SO₂NHC₂H₄SO₃Na | 3-(SO₂NH₂)phenyl | —NHSO₂CH₃ |
| 8 | —O⁻HN⁺Et₃ | —C(O)NHC₂H₄OH | 4-(CO₂⁻HN⁺Et₃)phenyl | —NHCOCH₃ |
| 9 | —ONa | —SO₂NHC₂H₄CO₂Na | phenyl | —NHCOC₂H₄CO₂Na |

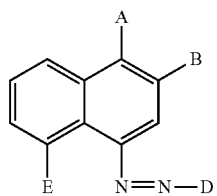

| | A | B | D | E |
|---|---|---|---|---|
| 10 | —ONa | H | 3-methylphenyl with CO₂Na (i.e., 3-methyl-5-CO₂Na-phenyl) | —NHSO$_2$CH$_3$ |
| 11 | —ONa | H | 3-methylphenyl | —NHSO$_2$-(3-SO$_3$K-phenyl) |
| 12 | —OK | —C(O)—NHPh | 3-methyl-5-SO$_3$K-phenyl | H |
| 13 | —OK | —NH—C(O)-(4-pyridyl) | 5-methyl-3-Ph-1,2,4-oxadiazol-yl | H |
| 14 | —OK | —SO$_2$N(Et)$_2$ | 5-methyl-1,2,4-thiadiazol-3-yl | —NHSO$_2$CH$_3$ |
| 15 | —OK | —SO$_2$NHC$_2$H$_4$CO$_2$K | 5-methyl-1,2,4-thiadiazol-3-yl | —NHSO$_2$-(3-CO$_2$K-phenyl) |
| 16 | —ONa | —C(O)—N-morpholinyl | 2-methyl-4,5-dicyano-1H-imidazol-yl | —NHSO$_2$CH$_3$ |
| 17 | —ONa | —NHCOC$_2$H$_4$CO$_2$Na | 5-methyl-4H-1,2,4-triazol-3-yl | —NHCOCH$_3$ |
| 18 | —NNaSO$_2$CH$_3$ | —C(O)—NHC$_2$H$_4$CO$_2$Na | 3-methyl-5-SO$_2$NH$_2$-phenyl | —NHSO$_2$CH$_3$ |

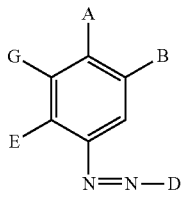
| | A | B | D | E | G |
|---|---|---|---|---|---|
| 19 | —ONa | —NHCOC₂H₅ | 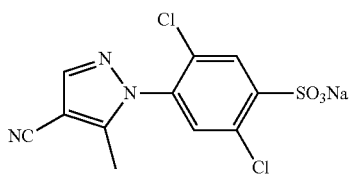 | H | Cl |
| 20 | —ONa | 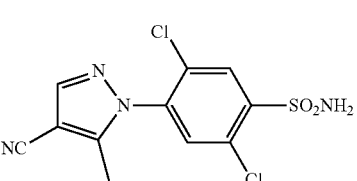 | 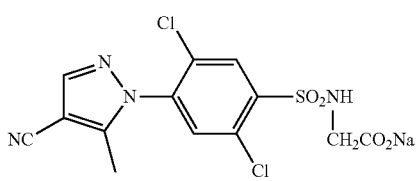 | H | Cl |
| 21 | —ONa | Cl | 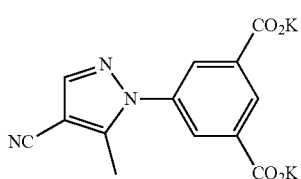 | H | Cl |
| 22 | —OK | Cl | 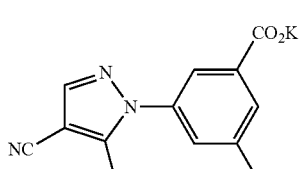 | H | Cl |
| 23 | —OK | Cl | 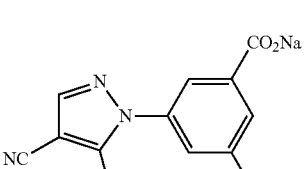 | H | H |
| 24 | —ONa | —NHCOCH₃ | 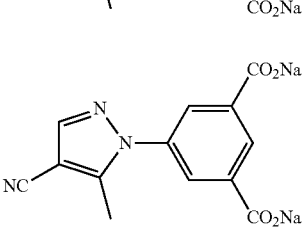 | H | Cl |
| 25 | —ONa | —CN |  | H | H |

-continued
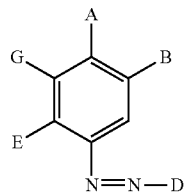
| | A | B | D | E | G |
|---|---|---|---|---|---|
| 26 | —ONa | Cl | ![pyrazole-CN-CH3-phenyl(CO2Na)2] | Cl | H |
| 27 | —ONa | ![benzamide-CO2Na with NH] | ![pyrazole-CN-CH3-phenyl(CO2Na)2] | H | Cl |
| 28 | —ONa | —CONHCH$_2$CO$_2$Na | ![pyrazole-CN-CH3-phenyl(CO2Na)2] | H | H |
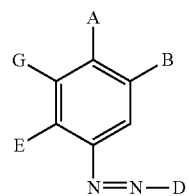
| | A | B | D | E | G |
|---|---|---|---|---|---|
| 29 | —ONa | —NHCOCH$_3$ | ![H3C-pyrazole-CN-CH3-phenyl-SO3Na] | H | —NHCOCH$_3$ |
| 30 | —ONa | ![CH3NH-CO-CH2CH2-CO2Na] | ![Cl-phenyl-SO2NH2-Cl with pyrazole-CN-CH3] | ![CH3NH-CO-CH2CH2-CO2Na] | H |
| 31 | —ONa | Cl | ![isothiazole with NC, CH3] | Cl | H |

-continued

[Structure: benzene ring with substituents A (top), B (upper right), G (upper left), E (left), and position with N=N—D (bottom)]

| | A | B | D | E | G |
|---|---|---|---|---|---|
| 32 | —OK | Cl | 3-cyano-2,5-dimethylthiophen-4-yl | Cl | H |
| 33 | —OK | 3-(N-methylcarbamoyl)phenyl-SO₃K | 2-methyl-5-(methylsulfonyl)-3-cyanophenyl | H | Cl |
| 34 | —ONa | 2,4-bis(NHCH₂CO₂Na)-6-(NH—)-1,3,5-triazine | 2-methyl-3-(methylsulfonyl)-5-sulfamoylphenyl | H | Cl |
| 35 | —ONa | Cl | 5-methyl-2-(methylsulfonyl)-1,3,4-thiadiazol-2-yl | Cl | Cl |
| 36 | —ONa | Cl | 5-methyl-3-methyl-1,2,4-thiadiazol-3-yl | Cl | H |
| 37 | —ONa | 2-(N-methylcarbamoyl)-phenyl-CO₂Na | 2,4-dimethyl-5-cyanothiazol-5-yl | H | Cl |
| 38 | —ONa | —CONHCH₂CO₂Na | 5-methyl-3-phenyl-1,2,4-oxadiazol-5-yl | H | H |

39

[Structure: pyridine with ONa, NHCOCH₃, H₃COCHN, N=N linked to phenyl bearing SO₂CH₃ and CN]

40

[Structure: pyridine with ONa, NHCOCH₃, H₃COCHN, N=N linked to phenyl bearing SO₂NHC₂H₄SO₃Na and CN]

41

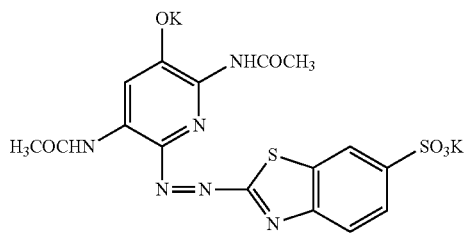

42

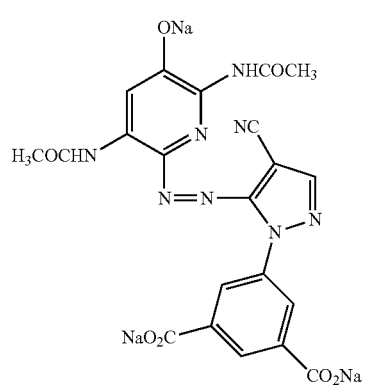

43

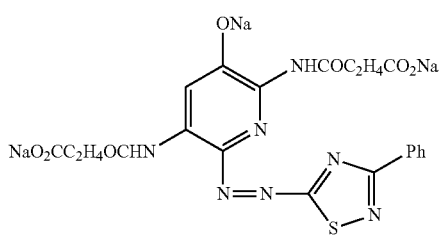

44

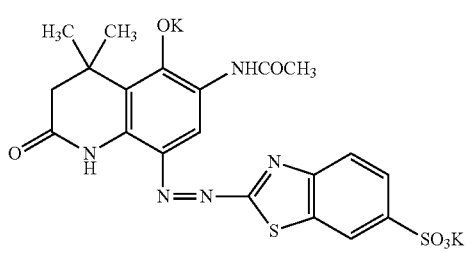

45

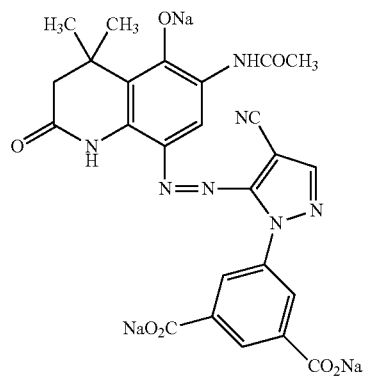

46

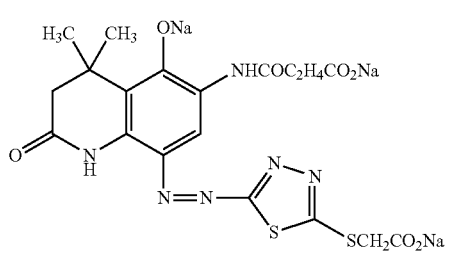

Next, as specific examples of a blue dye and cyan dye represented by Formula 1, Specific Example 47 to Specific Example 90 are shown. Note that, Specific Example 47 to Specific Example 90 are all shown in the form of omitting the notation of negative electric charge on the dissociated dissociable group and involving a counter cation (the notation of positive electric charge on the counter cation is also omitted). In Specific Example 54 to Specific Example 90, the group represented by A in the formula described on the upper side of each table is the dissociated group; in Specific Example 47 and Specific Example 51, —ONa is the dissociated group; and in Specific Examples 48, —OK is the dissociated group.

Specific Example 49 has a structure in which —C(CN)$_2^-$Na$^+$ is the dissociated group, which shows that the dissociable group —CH(CN)$_2$ becomes —C(CN)$_2^-$, and as a result, a negative charge is generated, which conjugates with the azo group, and that the counter cation is Na$^+$.

In Specific Example 50, —OK is a group which is dissociated and conjugates with the azo group, and in Specific Example 52, —NNa— that forms a ring is the dissociated group conjugating with the azo group.

In Specific Example 53, —N$^-$SO$_2$—(Na$^+$) is the dissociated group. The dissociable group —NHSO$_2$— becomes —N$^-$SO$_2$—, and as a result, a negative charge is generated to form a structure of conjugating with the azo group.

47

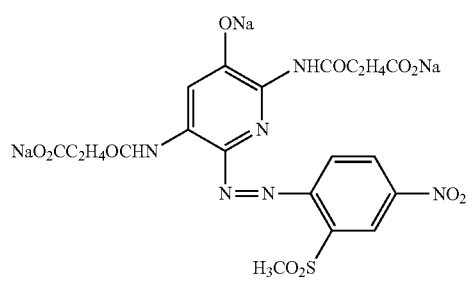

48

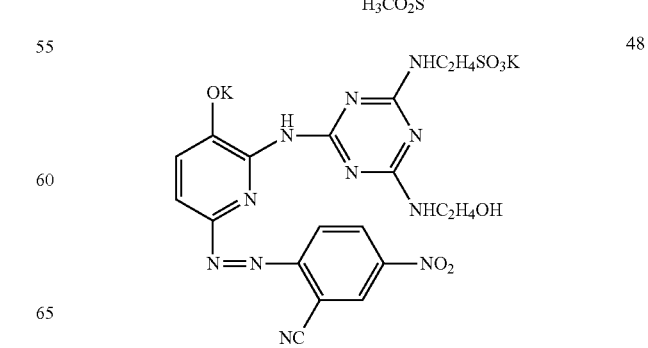

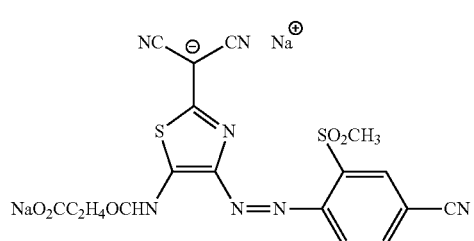
49
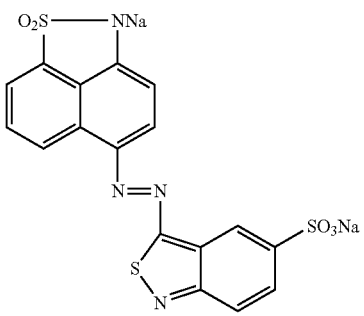
52
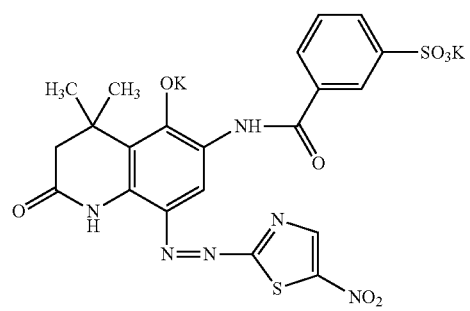
50
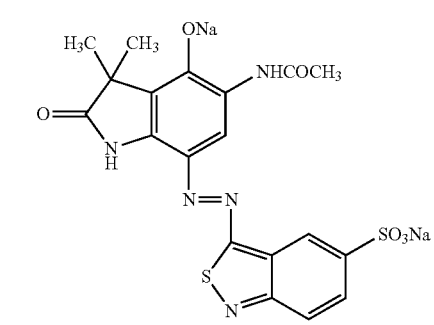
51
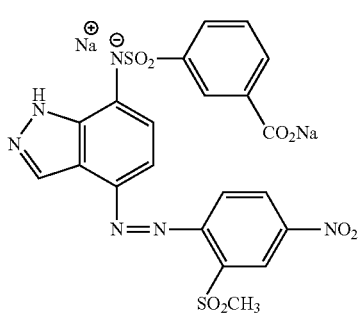
53
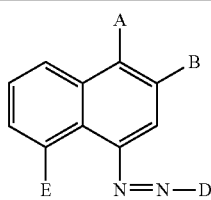
| | A | B | D | E |
|---|---|---|---|---|
| 54 | —ONa | —NHCOCH₃ | (4-methyl-3-cyanophenyl)-SO₂CH₃ | —NH—S(O₂)—(3-sulfamoylphenyl) |
| 55 | —ONa | —NHCOC₂H₄CO₂Na | 2-methyl-4,5-dicyano-thiazolyl | —NHSO₂CH₃ |
| 56 | —OK | NHCOCH₃ | (4-methyl-3-cyanophenyl)-SO₂NH-CH₂CO₂K | —NHSO₂CH₃ |

-continued

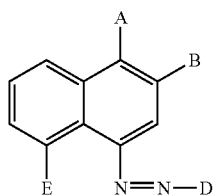

| | A | B | D | E |
|---|---|---|---|---|
| 57 | —OK | NHCOC$_2$H$_5$ | 5-methyl-2,1,3-benzothiadiazole | 2-(N-methylsulfamoyl)benzoate K |
| 58 | —OLi | —NHCOCH$_3$ | 4-cyano-5-methyl-1-(2,5-dichloro-4-lithiosulfonylphenyl)pyrazole | —NHSO$_2$CH$_3$ |
| 59 | —OK | 2-methyl-1H-benzimidazole-5-sulfonate K | 4-methyl-3-methylsulfonyl-nitrobenzene | H |
| 60 | —ONa | 2-methyl-1H-benzimidazole | 4-methyl-2,5-bis(methylsulfonyl)benzene | 3-(N-methylsulfamoyl)benzenesulfonate Na |
| 61 | —OK | 2-methyl-1H-benzimidazole | 2-cyano-4-methylsulfonyl-methylbenzene | 3-(N-methylsulfamoyl)benzenesulfonate Na |
| 62 | —ONa | 2-methyl-1H-benzimidazole | 4-cyano-5-methyl-1-(3,5-dicarboxylatophenyl)pyrazole Na$_2$ | —NHSO$_2$CH$_3$ |

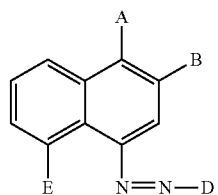

| | A | B | D | E |
|---|---|---|---|---|
| 63 | —ONa | 2-methyl-1H-benzimidazol-1-yl | 4-cyano-3,5-dimethylisothiazol-yl | —NHCOC$_2$H$_4$CO$_2$Na |
| 64 | —ONa | 2-methylbenzothiazol-yl | 2-methyl-5-nitro-3-cyanophenyl | —NHSO$_2$-(3-SO$_3$Na-phenyl) |
| 65 | —OK | benzothiazol-2-yl | 5-cyano-2-methyl-4-methylthiazol-yl | —NHSO$_2$-(2-CO$_2$K-phenyl) |
| 66 | —OK | 2,5-dimethyl-1,3,4-thiadiazol-yl | 4-methyl-3-cyano-(SO$_2$CH$_3$)phenyl | —NHSO$_2$-(3-SO$_3$K-phenyl) |
| 67 | —OLi | 2,5-dimethyl-1,3,4-thiadiazol-yl | 4-methyl-3-cyano-5-(SO$_2$NHC$_2$H$_4$SO$_3$Li)phenyl | —NHSO$_2$CH$_3$ |
| 68 | —OK | 2-(NH)-benzothiazol-yl | 2-methyl-4-nitro-3-SO$_2$CH$_3$-phenyl | H |
| 69 | —ONa | 2-(NH)-benzothiazol-yl | 4-methyl-3-SO$_2$CH$_3$-5-SO$_2$NH$_2$-phenyl | —NHSO$_2$-(3-SO$_3$Na-phenyl) |
| 70 | —OK | —SO$_2$NHC$_2$H$_4$SO$_3$K | 3-methyl-benzisothiazol-yl | —NHSO$_2$CH$_3$ |
| 71 | —ONa | 3-(CH$_3$CONH)-5-SO$_3$Na-phenyl | 2-(4-methyl-3-SO$_2$CH$_3$-phenyl)-4-cyano-5-methylthiazol-yl | —NHSO$_2$CH$_3$ |

|  | A | B | D | E |
|---|---|---|---|---|
| 72 | —ONa | —C(O)-morpholino | 2-methyl-5-nitro-thiazol-yl | —NHSO$_2$CH$_3$ |
| 73 | —ONa | —C(O)—NH—(3,5-di(CO$_2$Na)phenyl) | 4-methyl-2-SO$_2$CH$_3$-5,6-dicyanophenyl | —NHSO$_2$Ph |
| 74 | —OK | —C(O)—NH—C$_2$H$_4$CO$_2$K | 3,6-dicyano-5-methyl-2-methoxypyrazinyl | —NHCOOC$_4$H$_9$ |
| 75 | —OK | —C(O)—CH$_3$ | 3,4-dicyanophenyl (methyl) | H |
| 76 | —ONa | —Ph | 4-methyl-3-SO$_2$CH$_3$-nitrophenyl | H |
| 77 | —OK | H | 4-nitrophenyl (methyl) | H |
| 78 | —ONa | H | 2-CN-4-SO$_2$CH$_3$-methylphenyl | —NH—C(O)—(2-NaO$_3$S-phenyl) |
| 79 | —N(Na)—SO$_2$CH$_3$ | H | 2-CN-4-SO$_2$CH$_3$-methylphenyl | —NH—C(O)—(2-NaO$_3$S-phenyl) |
| 80 | —N(Na)—SO$_2$CH$_3$ | —SO$_2$NEt$_2$ | 4-methyl-3-SO$_2$CH$_3$-(5-methyl-1,3,4-oxadiazol-2-yl)phenyl | —NH—C(O)—(2-NaO$_3$S-phenyl) |

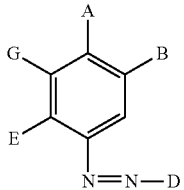
| | A | B | D | E | G |
|---|---|---|---|---|---|
| 81 | —ONa | —NHCOCH₃ | 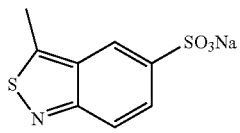 | H | —NHCOCH₃ |
| 82 | —ONa | 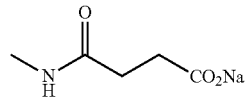 | 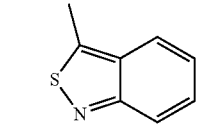 | H | 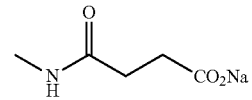 |
| 83 | —ONa | —NHCOCH₃ | 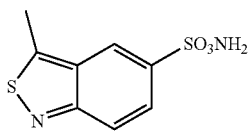 | H | —NHCOCH₃ |
| 84 | —OK | —NHCOOC₂H₅ | 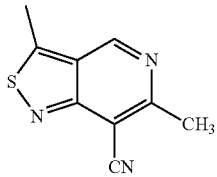 | H | H |
| 85 | —OK | NHCOCH₃ | 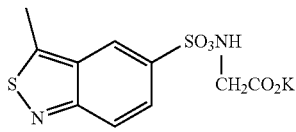 | —NHCOCH₃ | H |
| 86 | —ONa | NHCOCH₃ | 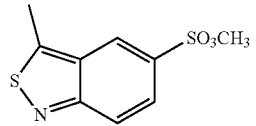 | —NHCOCH₃ | H |
| 87 | —ONa | —NHCOOC₂H₅ | 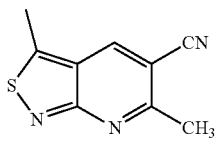 | H | t-C₄H₉ |
| 88 | —ONa | —NHCOCH₃ | 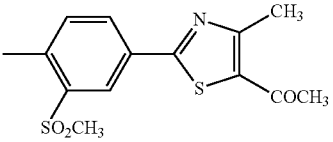 | H | 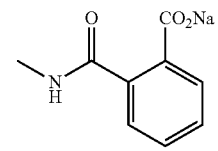 |
| 89 | —ONa | 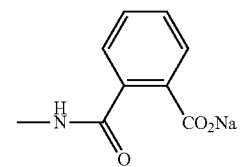 | 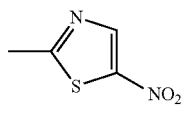 | —NHCOCH₃ | t-C₄H₉ |

-continued

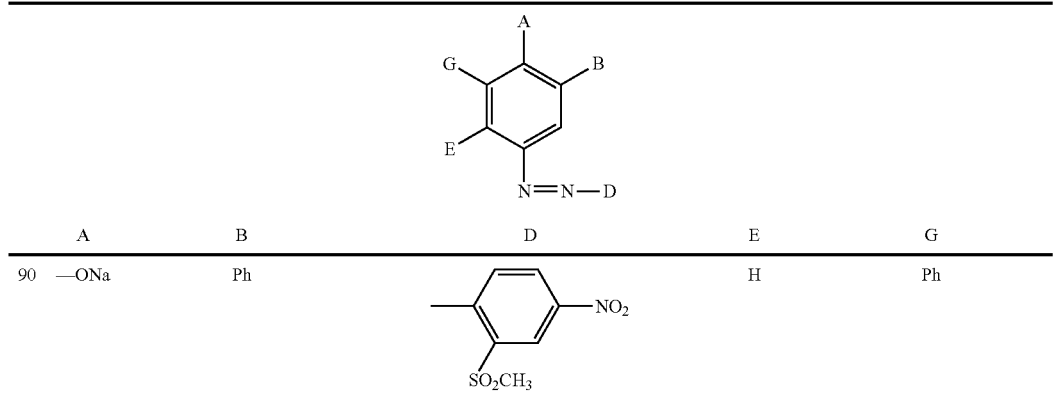

| | A | B | D | E | G |
|---|---|---|---|---|---|
| 90 | —ONa | Ph | | H | Ph |

Other specific examples of the azo dye represented by Formula 1 are shown as Specific Example 91 to Specific Example 94. Note that, Specific Example 91 to Specific Example 94 are all shown in the form of omitting the notation of negative electric charge on the dissociated dissociable group and involving a counter cation (the notation of positive electric charge on the counter cation is also omitted). In Specific Example 91 and Specific Example 92, —ONa is the dissociated group; in Specific Example 93, —NNa— that forms a ring is the dissociated group; and in Specific Example 94, NC—C$^-$(K$^+$)—CO—, which is produced when the dissociable group NC—CH—CO— that directly bonds to the azo group is dissociated, or an enol form thereof, NC—C=CO$^-$(K$^+$)—, is the dissociated group.

Embodiments of the dissociation of the dissociable groups are as described above.

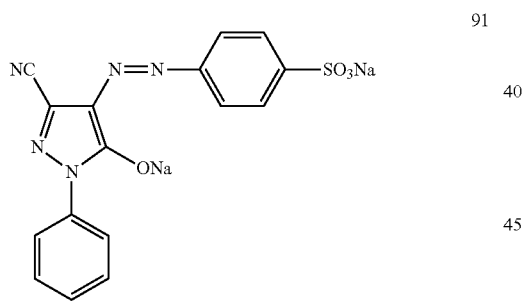

91

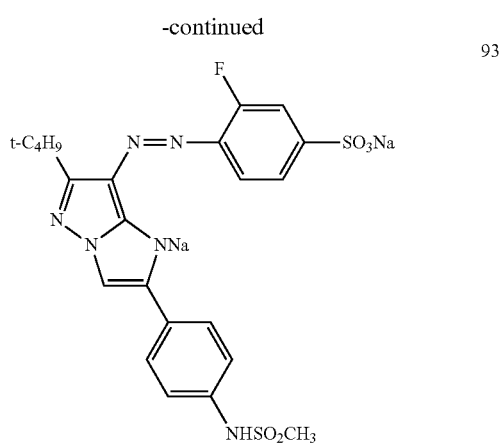

93

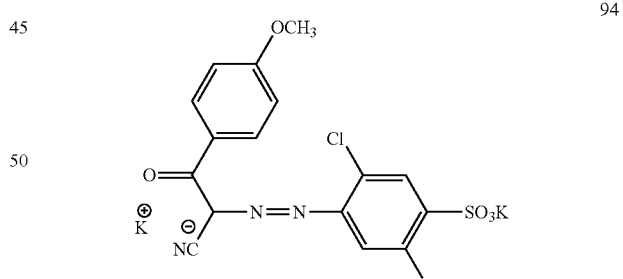

94

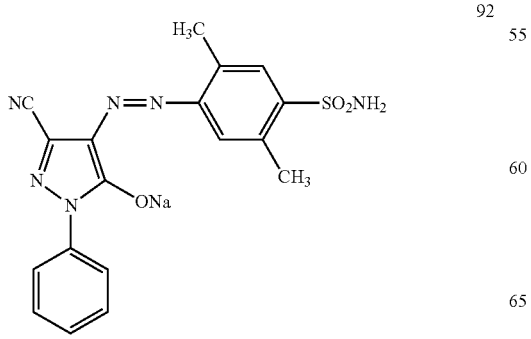

92

Specific examples of the oxonol dye represented by Formula 2 are shown as Specific Example 95 to Specific Example 115. Note that, Specific Example 95 to Specific Example 115 are all shown in the form of omitting the notation of negative electric charge on the dissociated dissociable group and involving a counter cation (the notation of positive electric charge on the counter cation is also omitted). In Specific Example 95 to Specific Example 103, —ONa is the dissociated group, and in Specific Example 104 to Specific Example 115, —OK is the dissociated group.

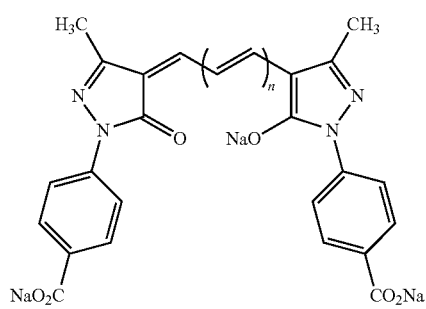

95 (n = 0)
96 (n = 1)
97 (n = 2)

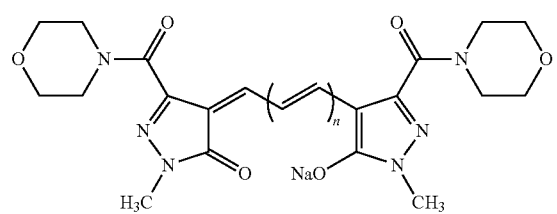

98 (n = 0)
99 (n = 1)
100 (n = 2)

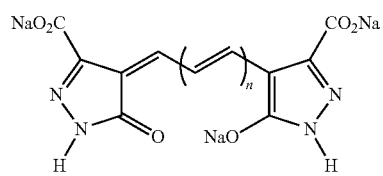

101 (n = 0)
102 (n = 1)
103 (n = 2)

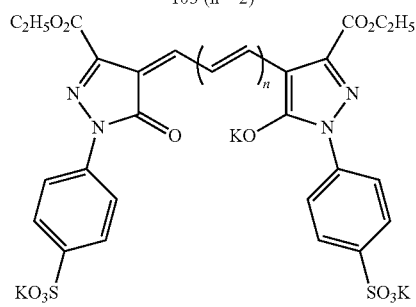

104 (n = 0)
105 (n = 1)
106 (n = 2)

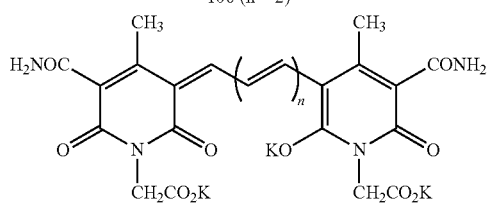

107 (n = 0)
108 (n = 1)
109 (n = 2)

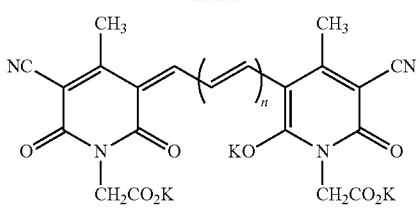

110 (n = 0)
111 (n = 1)
112 (n = 2)

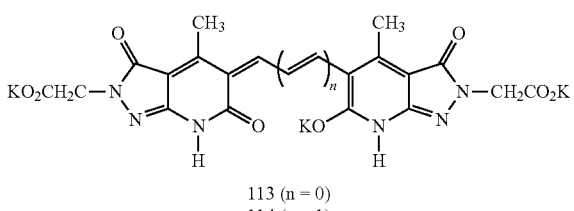

113 (n = 0)
114 (n = 1)

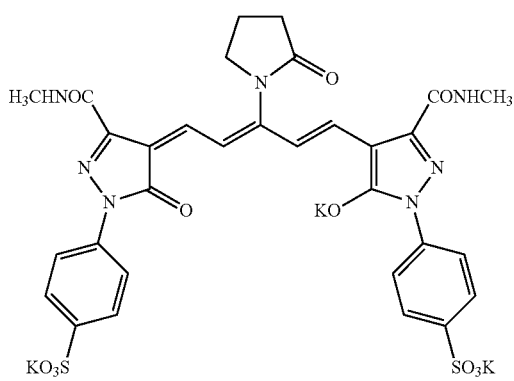

115

Specific examples of the dye represented by Formula 3 are shown as Specific Example 116 to Specific Example 127. Note that, Specific Example 116 to Specific Example 127 are all shown in the form of omitting the notation of negative electric charge on the dissociated dissociable group and involving a counter cation (the notation of positive electric charge on the counter cation is also omitted).

In Specific Examples 116 to 119 and Specific Examples 121 to 127, —ONa is the dissociated group, and in Specific Example 120, —OK is the dissociated group.

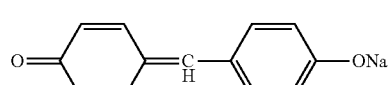

116

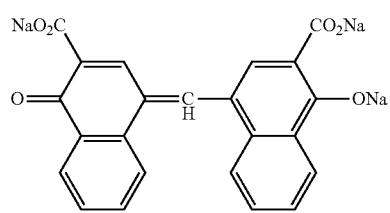

117

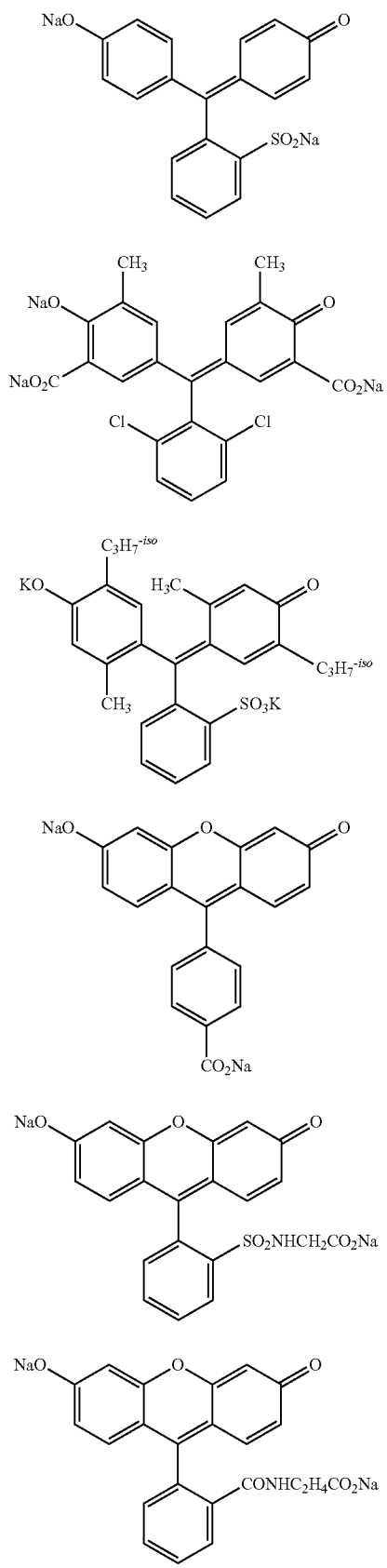

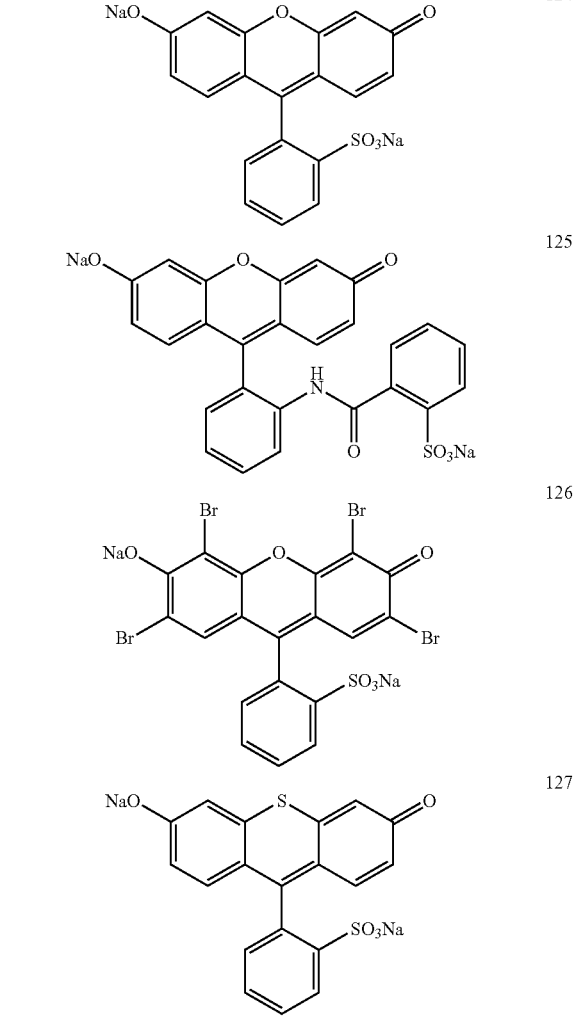

The specific colorants described above may be used singly, or in combination of two or more kinds thereof.

The coloring composition may be a composition containing only the above-described specific colorant as the colorant, or may further contain a colorant other than the specific colorant as long as the effects of the invention are not impaired.

In a case in which the coloring composition contains a colorant other than the specific colorant, a content of the specific colorant is preferably 50% by mass or higher, and more preferably 80% by mass or higher, with respect to a total mass of colorants in the coloring composition. In an embodiment, it is particularly preferable that 100% by mass of the colorant contained in the coloring composition is the specific colorant.

Considering the storage stability of the coloring composition and obtaining sufficient color optical density, a content of the specific colorant in the coloring composition is preferably from 0.1% by mass to 20% by mass, and more preferably from 0.2% by mass to 15% by mass, with respect to a total mass of the coloring composition.

The coloring composition may contain, other than the specific colorant described above, components such as water, an organic solvent, or a surfactant, if necessary.

[Water]

There is no particular limitation on water which may be contained in the coloring composition, and for example, ion exchanged water or tap water may be used.

In a case in which the coloring composition contains only the specific colorant and water, a content of water is the residue obtained by subtracting a content of the specific colorant from a total mass of the coloring composition, and in a case in which the coloring composition further contains additional components as described below, a content of water is the residue obtained by subtracting a total content of the specific colorant and the additional components from the total mass of the coloring composition.

[Organic Solvent]

The organic solvent, which may be contained in the coloring composition, is preferably an aqueous organic solvent, and examples thereof include polyhydric alcohols (for example, ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, 2-methyl-1,3-propanediol, or the like), amines (for example, ethanolamine, 2-(dimethylamino)ethanol, or the like), monovalent alcohols (for example, methanol, ethanol, butanol, or the like), alkyl ethers of polyhydric alcohol (for example, diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, dipropylene glycol monomethyl ether, or the like), 2,2'-thiodiethanol, amides (for example, N,N-dimethylformamide or the like), heterocycles (2-pyrrolidone or the like), and acetonitrile.

A content of the organic solvent in the coloring composition is preferably from 1% by mass to 60% by mass, and more preferably from 2% by mass to 50% by mass, with respect to a total mass of the coloring composition.

[Surfactant]

From the viewpoints of enhancing the storage stability, jetting stability, jetting accuracy, and the like, various surfactants can be used in the coloring composition. As the surfactant, any of a cationic surfactant, an anionic surfactant, an amphoteric surfactant, or a nonionic surfactant can be used.

Examples of the cationic surfactant include aliphatic amine salts, aliphatic quaternary ammonium salts, benzalkonium salts, benzethonium chloride, pyridinium salts, and imidazolinium salts.

Examples of the anionic surfactant include fatty acid soaps, N-acyl-N-methylglycine salts, N-acyl-N-methyl-β-alanine salts, N-acylglutamic acid salts, alkyl ether carboxylic acid salts, acylated peptides, alkylsulfonic acid salts, alkylbenzenesulfonic acid salts, alkylnaphthalenesulfonic acid salts, dialkylsulfosuccinic acid ester salts, alkylsulfoacetic acid salts, α-olefinsulfonic acid salts, N-acyl methyltaurine, sulfated oils, higher alcohol sulfuric acid ester salts, secondary higher alcohol sulfuric acid ester salts, alkyl ether sulfuric acid salts, secondary higher alcohol ethoxy sulfates, polyoxyethylene alkyl phenyl ether sulfuric acid salts, monogly sulfate, fatty acid alkylol amido sulfuric acid ester salts, alkyl ether phosphoric acid ester salts, and alkyl phosphoric acid ester salts.

Examples of the amphoteric surfactant include carboxybetaine surfactants, sulfobetaine surfactants, aminocarboxylic acid salts, and imidazolinium betaine.

Examples of the nonionic surfactant include polyoxyethylene alkyl ether, polyoxyethylene secondary alcohol ether, polyoxyethylene alkyl phenyl ether, polyoxyethylene sterol ether, polyoxyethylene lanoline derivatives, polyoxyethylene polyoxypropylene alkyl ether, polyoxyethylene glycerin fatty acid ester, polyoxyethylene castor oil, hardened castor oil, polyoxyethylene sorbitan fatty acid ester, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol, and acetylene alcohol.

In the case of using these surfactants, the surfactants may be used singly, or in mixture of two or more kinds thereof.

A content of the surfactant in the coloring composition is preferably in a range of from 0.001% by mass to 5.0% by mass with respect to a total mass of the coloring composition, and it is preferable to properly adjust the surface tension of the coloring composition by using the surfactant within this range.

[Antiseptic and Mildew Proofing Agent]

The coloring composition may contain at least one of an antiseptic or a mildew proofing agent in order to maintain the long-term storage stability. Examples of the antiseptic and mildew proofing agent include aromatic halogen compounds (for example, trade name: PREVENTOL CMK; manufactured by LANXESS Corporation), methylene dithiocyanate, halogen-, nitrogen-, and sulfur-containing compounds, and 1,2-benzisothiazolin-3-one (for example, PROXEL® GXL; manufactured by Arch Chemicals, Inc.).

[Various Additives]

The coloring composition may further contain conventionally known additives. Examples include a pH adjusting agent such as acid, base or buffer solution, a fluorescent brightening agent, an antifoaming agent, a lubricant, a thickener, an antistatic agent, a matting agent, an antioxidant, a specific resistance adjusting agent, a rust preventive, an inorganic pigment, and a reduction preventing agent.

<Ink>

The ink according to an embodiment of the invention includes, as essential components, water and a colorant which has a chromophoric group and a dissociable group that is in a dissociated state, in which the chromophoric group and a negative electric charge generated by the dissociation of the dissociable group can form a conjugated system, and the colorant has one dissociable group per one chromophoric group (the specific colorant). Namely, the coloring composition can be used as the ink.

The contents of the specific colorant and water in the ink are each preferably within the ranges described above as the contents thereof in the coloring composition, respectively.

The ink may be used in any manner, but since the coloring composition exhibits a high color optical density and excellent water resistance, the ink is preferable as an ink for inkjet recording, which has a restriction in the supply amount of colorant onto fabric.

<Fabric>

The coloring composition is suitable for fabric printing.

The kind of fabric is not particularly limited, and fabrics including various kinds of fibers, such as rayon, cotton, polyester fiber, or polyamide fiber can be used. Among them, from the viewpoint of more sufficiently exhibiting the effect of the invention, a fabric including polyamide fiber is preferable, and above all, nylon, silk, and wool are preferable. The fabric including polyamide fiber may be in any form such as a woven fabric, a knit, a non-woven fabric, or the like.

The fabric including polyamide fiber is preferably a fabric of 100% polyamide fiber, but may include a material other than polyamide fiber. In a case in which the fabric includes fiber other than polyamide fiber, a content of the polyamide fiber is preferably 30% or higher, and more preferably 50% or higher, with respect to a total mass of the fabric. Regarding the material other than polyamide fiber, a blend woven fabric or blend non-woven fabric with, for example, rayon, cotton, acetate, polyurethane, acrylic fiber, or the like, can also be used as the fabric for textile printing.

Physical properties of the polyamide fiber that forms a fabric or the thread formed by using the polyamide fiber have their preferable ranges. For example, in a case in which the polyamide is nylon, an average thickness of nylon fiber is preferably regulated within a range of from 1 denier (d) to 10 d, and more preferably from 2 d to 6 d, and an average thickness of nylon thread which is formed by using the nylon fiber is preferably controlled within a range of from 20 d to 100 d, more preferably from 25 d to 80 d, and still more preferably from 30 d to 70 d, and such fiber and thread may be used. Further, in a case in which the polyamide is silk, as the properties of the fiber itself, an average thickness of silk fiber is regulated within a range of from 2.5 d to 3.5 d, and more preferably from 2.7 d to 3.3 d, and an average thickness of silk thread which is formed by using the silk fiber is regulated within a range of from 14 d to 147 d, and more preferably from 14 d to 105 d, and a fabric prepared according to a known method may be used.

<Textile Printing Method>

A textile printing method according to an embodiment of the invention is a method of applying an ink, which is an aqueous coloring composition for textile printing, the aqueous coloring composition containing water and a colorant, in which a negative electric charge generated by dissociation conjugates with a chromophoric group thereof, that is, the ink according to the embodiment of the invention, to a fabric by an inkjet method.

The fabric is preferably a fabric including polyamide fiber.

The inkjet method is a method of jetting an ink from an inkjet recording head and applying the ink to a fabric, thereby printing an image.

In the application of ink to a fabric, the fabric may be subjected to a pretreatment for the purpose of further enhancing the fixation of the colorant to the fabric.

[Pretreatment]

The pretreatment which is carried out before application of ink to the fabric is a treatment of applying, to the fabric before application of ink, a pretreatment agent such as a hydrotropy agent, an aqueous (water-soluble) metal salt, a pH adjusting agent, a pH buffering agent, or an aqueous (water-soluble) polymer.

In the pretreatment, it is preferable that the pretreatment agent is applied to the fabric by padding at an expression of from 5% to 150%, preferably from 10% to 130%. Further, a water repelling agent, a surfactant, or the like may be applied to the fabric.

Examples of the aqueous polymer include a natural aqueous polymer and a synthetic aqueous polymer. Examples of the natural aqueous polymer include known natural aqueous polymers, for example, starch substances of corn, wheat, or the like, cellulose-based substances such as carboxy methyl cellulose, methyl cellulose, or hydroxyethyl cellulose, polysaccharides such as sodium alginate, Arabic gum, locust bean gum, tranto gum, guar gum, or tamarind beans, protein substances such as gelatin or casein, tannin based substances, lignin-based substances, or the like.

Examples of the synthetic aqueous polymer include known polyvinyl alcohol compounds, polyethylene oxide compounds, acrylic acid-based aqueous polymers, and maleic anhydride-based aqueous polymers. Among them, polysaccharide polymers and cellulose-based polymers are preferable.

Examples of the aqueous metal salt include compounds which have a pH of from 4 to 10 and form a typical ionic crystal, such as an alkali metal halide or an alkaline earth metal halide. Representative examples of such compounds include, as a compound including an alkali metal, NaCl, $Na_2SO_4$, KCl, and $CH_3COONa$, and as a compound including an alkaline earth metal, $CaCl_2$ and $MgCl_2$. Above all, salts of Na, K, or Ca are preferable.

Examples of the water repelling agent include, but are not particularly limited to, paraffin compounds, fluorine-containing compounds, pyridinium salts, N-methylol alkyl amide, alkylethylene urea, oxaline derivatives, silicone-containing compounds, triazinebased compounds, zirconium-containing compounds, and any mixture thereof. Among these water repelling agents, a paraffin-based water repelling agent and a fluorine-containing water repelling agent are particularly preferable from the viewpoint of bleeding suppression and concentration. An amount of the water repelling agent applied to the fabric is preferably in a range of from 0.05% by mass to 40% by mass, and more preferably in a range of from 0.5% by mass to 10% by mass, with respect to a total mass of the fabric. The effect of suppressing excess permeation of ink may be small when the amount of the water repelling agent is less than 0.05% by mass, and there are cases in which a great change in terms of performance is not seen even when the water repelling agent is contained in an amount more than 40% by mass.

As the surfactant, an anionic surfactant, a nonionic surfactant, an amphoteric surfactant, or the like can be used.

Preferably, a nonionic surfactant having an HLB of 12.5 or higher, and more preferably an HLB of 14 or higher, can be used.

As the amphoteric surfactant, a betaine surfactant or the like can be used.

An amount of the surfactant applied to fabric is preferably from 0.01% by mass to 30% by mass with respect to a total mass of the fabric. Further, according to the characteristics of the dye to be used and the like, it is preferable to add additives such as a reduction preventing agent, an antioxidant, a level dyeing agent, a deep dyeing agent, a carrier, a reducing agent, or an oxidizing agent.

In the pretreatment, the method for applying the above pretreatment agents to the fabric is not particularly limited, and examples of the method may include generally used methods such as a dipping method, a padding method, a coating method, a spraying method, and an inkjet method.

In the textile printing method, it is desirable that, after applying ink to fabric to perform printing, the printed fabric is wound up, then the fabric is heated, thereby allowing to perform color formation, and then the fabric is washed and dried.

In the textile printing according to the inkjet method, by carrying out the above procedure, dyeing with the specific colorant may be sufficiently performed, as compared with the case of printing ink to fabric and leaving the fabric as it is and, as a result, high color optical density and excellent water resistance can be exhibited. In particular, in a case in which printing is successively performed for a long time while conveying a long size fabric by using rolls or the like, since the printed fabric is conveyed and comes out in a long line, the printed fabric may be piled up on the floor or the like. A fabric in such a state needs a wide place, as well as it is not safe, and there are cases in which the fabric is unexpectedly soiled. Accordingly, it is preferable to perform an operation of winding up the printed fabric after printing. At the time of this winding operation, a medium that does not affect printing, such as paper, fabric, or a plastic sheet may be placed between the fabrics. However, in the case of cutting the printed fabric on the way or in a case in which the printed fabric is short, it is not always necessary to wind up the printed fabric.

The fabric to which the ink according to the embodiment of the invention has been applied from an inkjet recording head is preferably subjected to a post-treatment, whereby fixation of the specific colorant to the fiber is accelerated, and thereafter, it is preferable to sufficiently remove the unfixed colorant, other components, and pretreatment agents.

[Post-Treatment]

The post treatment is divided into some processes.

—Preliminary Drying Process—

First, after applying the ink according to the embodiment of the invention to the fabric, it is preferable to leave this fabric for 0.5 minutes to 30 minutes under the temperature condition of ordinary temperature to 150° C., thereby performing preliminarily drying of ink. This preliminary drying makes it possible to increase the printing density and effectively prevent bleeding. Note that, this preliminary drying also involves permeation of ink into fabric.

In the textile printing, it is also possible to carry out preliminary drying by heat drying in a continuous process. A fabric which is in the roll state is supplied to an inkjet textile printing machine and is printed (performing textile printing by printing), and thereafter, the printed fabric is dried using a dryer, before winding up the printed fabric. The dryer may be a dryer that is directly connected with the textile printing machine, or may be a dryer that is separated from the textile printing machine. It is preferable that drying of the printed fabric in the dryer is performed for 0.5 minutes to 30 minutes under a temperature condition of ordinary temperature to 150° C. Preferable examples of a drying method include an air convection system, a heating roll direct-connecting system, and a radiation system.

—Steaming Process—

The post treatment can include treating the printed fabric with heat. Preferably, the heat treatment can be carried out after preliminary drying. Preferably, the heat treatment can include a steaming process. It is preferable to change conditions of the steaming process, particularly, the time period of the steaming process, depending on the kind of the fabric.

For example, in a case in which the fabric is a fabric including wool as the main component, the time period of the steaming process is preferably from 1 minute to 120 minutes, and more preferably from about 3 minutes to about 90 minutes. Further, in a case in which the fabric is a fabric including silk as the main component, the time period of the steaming process is preferably from 1 minute to 40 minutes, and more preferably from about 3 minutes to about 30 minutes. Moreover, in a case in which the fabric is a fabric including nylon as the main component, the time period of the steaming process is preferably from about 1 minute to about 90 minutes, and more preferably from about 3 minutes to about 60 minutes. Here, that the fabric includes a certain fiber material "as the main component" means that a content of the fiber material is the highest among contents of fiber materials contained in the fabric.

—Washing Process—

Regarding the ink that has been inkjet-recorded on the fabric, most part of the ink is fixed to the fabric, but there may be a case in which a part of the ink is not fixed to the fiber. It is preferable to remove this unfixed colorant from the fabric. For removing the unfixed colorant, a conventionally known washing method can be employed. For example, it is preferable to use water or hot water in a temperature range of ordinary temperature to 100° C., or to use an anionic or nonionic soaping agent. By substantially removing all the unfixed coloring materials, favorable results can be obtained in terms of various water resistances, for example, laundering fastness, fastness to sweat, or the like.

—Drying Process (Drying after Washing)—

After washing the printed fabric, the fabric is dried. Drying can be conducted by squeezing or dehydrating the fabric that has been washed, and then hanging out the fabric or drying the fabric using a dryer, a heat roll, an iron, or the like.

<Textile Printing Kit>

A textile printing kit according to an embodiment of the invention is a kit including at least a fabric and the coloring composition according to the embodiment of the invention. Fabric printing can be carried out by using this textile printing kit. The fabric is preferably a fabric including polyamide fiber. This textile printing kit can be preferably used in a textile printing method by an inkjet method using the coloring composition as the ink.

EXAMPLES

Hereinafter, the invention is specifically described with reference to the examples, but it should be construed that the invention is in no way limited to the following examples as long as not departing from the scope of the invention. Unless otherwise stated, the "parts" and "%" are based on mass.

Examples 1 to 16, and Comparative Examples 1 to 2

Preparation of Ink Composition

The components were mixed according to the formulation described below, and the mixture thus obtained was filtrated using a membrane filter having a pore diameter of 10 μm, thereby preparing inks 1 to 16 and inks 101 to 102. For the glycerin and diethylene glycol, those manufactured by Wako Pure Chemical Industries, Ltd. were used.

Dye shown in Table 1 (specific colorant or colorant for comparison) 5%

Glycerin [manufactured by Wako Pure Chemical Industries, Ltd.] (aqueous organic solvent) 10%

Diethylene glycol [manufactured by Wako Pure Chemical Industries, Ltd.] (aqueous organic solvent) 10%

OLFINE E1010 [trade name, manufactured by Nissin Chemical Industry Co., Ltd.] (acetylene glycol type surfactant) 1%

Water 74%

TABLE 1

| Ink | Dye |
| --- | --- |
| 1 | Dye of Specific Example 1 |
| 2 | Dye of Specific Example 4 |
| 3 | Dye of Specific Example 6 |
| 4 | Dye of Specific Example 19 |
| 5 | Dye of Specific Example 26 |
| 6 | Dye of Specific Example 36 |

TABLE 1-continued

| Ink | Dye |
|---|---|
| 7 | Dye of Specific Example 39 |
| 8 | Dye of Specific Example 122 |
| 101 (Comparative) | C.I. Acid Red 52 |
| 9 | Dye of Specific Example 47 |
| 10 | Dye of Specific Example 54 |
| 11 | Dye of Specific Example 61 |
| 12 | Dye of Specific Example 75 |
| 13 | Dye of Specific Example 79 |
| 14 | Dye of Specific Example 83 |
| 15 | Dye of Specific Example 88 |
| 16 | Dye of Specific Example 97 |
| 102 (Comparative) | C.I. Direct Blue 86 |

The colorants (dyes) of the respective specific examples, which were used in the inks 1 to 16 and are shown in Table 1, were synthesized with reference to JP-A No. S55-60559.

C.I. Acid Red 52

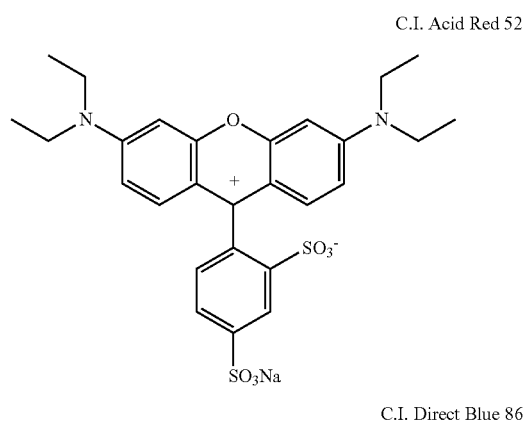

C.I. Direct Blue 86

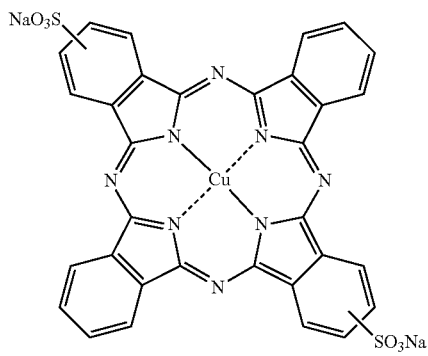

<Preparation of Textile Printing Sample>

—Preparation of Pretreatment Agent—

| | |
|---|---|
| Guar gum [trade name: MEYPRO GUM NP, manufactured by NISSHO CO., LTD.] | 2% |
| Urea [manufactured by Wako Pure Chemical Industries, Ltd.] | 5% |
| Ammonium sulfate [manufactured by Wako Pure Chemical Industries, Ltd.] | 4% |
| Water | 89% |

The components of the above formulation were mixed, thereby preparing a pretreatment agent.

Using the pretreatment agent thus obtained, a silk fabric was subjected to padding at an expression of 90% to obtain a treated fabric. The inks (inks 1 to 16 and 101 to 102) obtained were each installed in an inkjet printer (trade name: DMP-2381, manufactured by Dimatix, Inc.), and a solid image was printed on the treated fabric thus obtained.

After subjecting the printed fabric to preliminary drying, the resulting printed fabric was subjected to steaming with saturated steam of 100° C. for 5 minutes in a steaming process, to fix the colorant to the fiber of the fabric. Thereafter, the fabric was washed in cold water for 10 minutes, then washed in hot water at 60° C. for 5 minutes, and then dried.

Separately, similar experiments were carried out by changing the silk fabric to a nylon taffeta fabric or a wool fabric.

<Evaluation>

1. Evaluation of Color Optical Density

With regard to the solid images formed on the fabrics, the density and density unevenness were visually observed, and evaluation of density was performed according to the following criteria.

—Evaluation Criteria—

S: Sufficient density is realized and there is no density unevenness.

A: The density is somewhat lower, but occurrence of density unevenness is not recognized.

B: The density is somewhat lower, and occurrence of density unevenness is recognized.

2. Evaluation of Water Resistance

With regard to the respective fabrics having a solid image formed thereon, evaluation of water resistance was performed in terms of discoloration grades according to JIS L0846, which substantially corresponds to ISO 105-E01: 1994. Evaluation of water resistance was not carried out with regard to the samples which did not have sufficient color optical density. The grade 3 or higher is deemed as acceptable.

The respective results obtained in a manner as described above are shown in Table 2.

TABLE 2

| | | Silk | | Nylon | | Wool | |
|---|---|---|---|---|---|---|---|
| | Ink | Color Optical Density | Water Resistance | Color Optical Density | Water Resistance | Color Optical Density | Water Resistance |
| Example 1 | 1 | S | 4 | S | 4-5 | S | 4-5 |
| Example 2 | 2 | S | 4 | S | 4-5 | S | 4-5 |
| Example 3 | 3 | S | 4 | S | 4 | S | 4 |

TABLE 2-continued

| | Ink | Silk Color Optical Density | Silk Water Resistance | Nylon Color Optical Density | Nylon Water Resistance | Wool Color Optical Density | Wool Water Resistance |
|---|---|---|---|---|---|---|---|
| Example 4 | 4 | S | 3-4 | S | 3-4 | S | 3-4 |
| Example 5 | 5 | S | 3-4 | S | 4 | S | 3-4 |
| Example 6 | 6 | S | 4 | S | 4 | S | 4 |
| Example 7 | 7 | S | 4 | S | 4 | S | 4 |
| Example 8 | 8 | S | 4 | S | 4 | S | 4 |
| Comparative Example 1 | 101 | A | 1 | B | — | B | — |
| Example 9 | 9 | S | 3-4 | S | 4 | S | 3-4 |
| Example 10 | 10 | S | 4 | S | 4-5 | S | 4 |
| Example 11 | 11 | S | 3-4 | S | 3-4 | S | 3-4 |
| Example 12 | 12 | S | 4 | S | 4 | S | 4 |
| Example 13 | 13 | S | 3-4 | S | 3 | S | 3 |
| Example 14 | 14 | S | 4 | S | 4-5 | S | 4 |
| Example 15 | 15 | S | 4 | S | 4 | S | 4 |
| Example 16 | 16 | S | 3-4 | S | 4 | S | 4 |
| Comparative Example 2 | 102 | A | 1 | B | — | B | — |

As is seen from Table 2, in the inks using a conventional colorant, high color optical density and water resistance could not be achieved at the same time.

Comparative Example 3

Dye A (the structural formula described below) described in JP-A No. 2009-507083 was synthesized with reference to JP-A No. 2009-507083. Preparation of ink 103 of Comparative Example 3 was tried in a manner similar to that in the preparation of the ink 1 of Example 1, except that the obtained dye A was used instead of using the dye of Specific Example 1; however, since the dye A did not sufficiently dissolve in water, the evaluation of color optical density and the evaluation of water resistance could not be performed.

Dye A

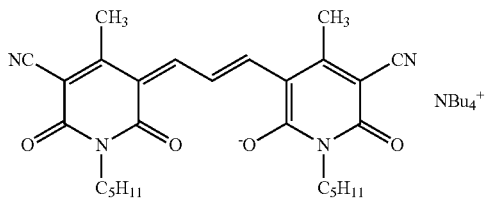

Comparative Example 4

Preparation of ink 104 of Comparative Example 4 was conducted in a manner similar to that in the preparation of the ink 1 of Example 1, except that the following dye IV described in Application Example D described in JP-A No. 2004-511610 was used instead of using the dye of Specific Example 1.

(IV)

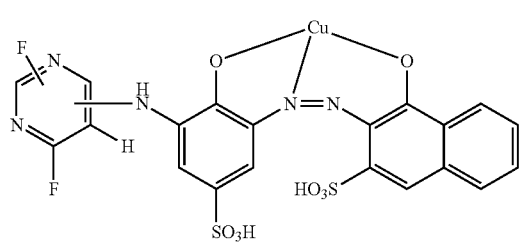

With regard to the ink 104, evaluation of color optical density and evaluation of water resistance were conducted according to the same method used for the ink 1 of Example 1 and the same evaluation criteria and, as a result, the evaluation result of color optical density evaluation was B and the evaluation result of water resistance evaluation was grade 2-3.

The disclosure of Japanese Patent Application No. 2011-218116 is incorporated by reference herein in its entirety.

All publications, patents, patent applications, and technical standards mentioned in this specification are herein incorporated by reference to the same extent as if such individual publication, patent, patent application, or technical standard was specifically and individually indicated to be incorporated by reference.

What is claimed is:

1. An aqueous coloring composition for textile printing, the aqueous coloring composition comprising a colorant and water, wherein:
    a molecule of the colorant comprises a chromophoric group and a dissociable group that is in a dissociated state;
    the chromophoric group and a negative electric charge, generated by dissociation of the dissociable group, form a conjugated system; and
    a number of the dissociable groups in the molecule of the colorant is the same as a number of the chromophoric groups in the molecule; and wherein
    the colorant is an azo dye represented by the following Formula 1-1:

Formula 1-1

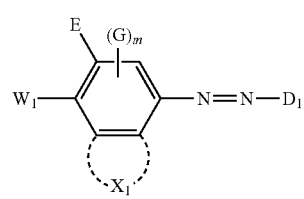

wherein, in Formula 1-1, $D_1$ represents a cyclic hydrocarbon group or a heterocyclic group may have a substituent; E represents a hydrogen atom, an acylamino group, or an electron withdrawing group; the benzene ring shown in Formula 1-1 may be condensed with a ring including $X_1$ as a component; G represents a substituent that bonds to the benzene ring shown in Formula 1-1 or the condensed ring including $X_1$ as a component; m represents an integer from 0 to 4; $W_1$ represents an anionic substituent selected from —O$^-$, —S$^-$, —N$^-$(R$^1$), and —C$^-$(R$^1$)(R$^2$), and each of R$^1$ and R$^2$ independently represents an electron withdrawing group having a Hammett σp value of 0.30 or higher.

2. The coloring composition according to claim 1, wherein the colorant is a dye.

3. An ink for inkjet recording, comprising the coloring composition according to claim 1.

4. A textile printing method comprising applying, by an inkjet method, the coloring composition according to claim 1 to a fabric comprising a polyamide fiber.

5. A fabric comprising an image printed by the method according to claim 4.

6. A kit for textile printing, the kit comprising the coloring composition according to claim 1 and a fabric comprising a polyamide fiber.

\* \* \* \* \*